US012606462B2

(12) United States Patent
Dai et al.

(10) Patent No.: US 12,606,462 B2
(45) Date of Patent: Apr. 21, 2026

(54) PROCESS FOR REMOVING CYANIDE FROM A CYANIDE-BEARING AQUEOUS FLUID

(71) Applicant: Commonwealth Scientific and Industrial Research Organisation, Acton (AU)

(72) Inventors: Xianwen Dai, Aubin Grove (AU); Paul Breuer, Bull Creek (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 359 days.

(21) Appl. No.: 18/250,571

(22) PCT Filed: Oct. 25, 2021

(86) PCT No.: PCT/AU2021/051239
§ 371 (c)(1),
(2) Date: Apr. 26, 2023

(87) PCT Pub. No.: WO2022/087656
PCT Pub. Date: May 5, 2022

(65) Prior Publication Data
US 2023/0399241 A1 Dec. 14, 2023

(30) Foreign Application Priority Data
Oct. 27, 2020 (AU) ................................. 2020903887

(51) Int. Cl.
*C02F 1/26* (2023.01)
*B01D 11/02* (2006.01)
(Continued)

(52) U.S. Cl.
CPC .............. *C02F 1/26* (2013.01); *B01D 11/028* (2013.01); *B01D 11/0288* (2013.01);
(Continued)

(58) Field of Classification Search
CPC .. C02F 1/26; C02F 1/42; C02F 1/5209; C02F 1/66; C02F 2001/422; C02F 2101/18;
(Continued)

(56) References Cited

U.S. PATENT DOCUMENTS 3,984,314 A * 10/1976 Fries ........................ B01J 41/05
423/24
4,267,159 A 5/1981 Crits
(Continued)

FOREIGN PATENT DOCUMENTS

CN        101157509 A *  4/2008  ............... C02F 1/28
WO     WO 1987/00072 A1     1/1987
(Continued)

OTHER PUBLICATIONS

English translation of CN101157509A, Apr. 9, 2008. (Year: 2008).*
(Continued)

*Primary Examiner* — Joseph W Drodge
(74) *Attorney, Agent, or Firm* — Crowell & Moring LLP

(57) ABSTRACT

The invention provides a process for removing cyanide from a cyanide-bearing aqueous fluid, the process comprising: (i) adding a solid composition comprising a first mixed-metal cyanide complex comprising copper and iron to a cyanide-bearing aqueous fluid comprising free cyanide and metal-complexed cyanide, wherein at least a portion of the first mixed-metal cyanide complex dissolves, with complexation of the copper by the free cyanide, to produce an aqueous solution comprising cyanometallates, the cyanometallates comprising copper cyanide and iron cyanide complexes derived from the first mixed-metal cyanide complex; (ii) contacting the aqueous solution with an anion-exchange absorbent to absorb the cyanometallates, thereby producing a cyanide-lean aqueous fluid; (iii) extracting the anion-exchange absorbent comprising the absorbed cyanometal-
(Continued)

lates with at least one non-acidic aqueous extractant to produce an aqueous extract comprising the copper cyanide and iron cyanide complexes; and (iv) acidifying the aqueous extract to produce a precipitate comprising a second mixed-metal cyanide complex comprising copper and iron.

20 Claims, 8 Drawing Sheets

(51) Int. Cl.

| | | |
|---|---|---|
| *B01J 41/00* | (2006.01) | |
| *C02F 1/42* | (2023.01) | |
| *C02F 1/52* | (2023.01) | |
| *C02F 1/66* | (2023.01) | |
| *C02F 101/18* | (2006.01) | |
| *C02F 103/16* | (2006.01) | |

(52) U.S. Cl.

CPC ................ *B01J 41/00* (2013.01); *C02F 1/42* (2013.01); *C02F 1/5209* (2013.01); *C02F 1/66* (2013.01); *C02F 2001/422* (2013.01); *C02F 2101/18* (2013.01); *C02F 2103/16* (2013.01); *C02F 2303/18* (2013.01)

(58) Field of Classification Search

CPC ............. C02F 2103/16; C02F 2303/18; C02F 2101/38; C02F 2303/16; C02F 1/683; C02F 2103/10; C01C 3/11; C01C 3/12; B01J 41/05; B01J 49/57; B01J 49/07; B01J 41/00; B01J 41/02; B01J 41/04; Y02P 10/20; C22B 3/288; C22B 3/42; C22B 11/08; A62D 2101/45; A62D 3/33; B01D 11/02; B01D 11/028; B01D 11/0288

See application file for complete search history.

(56) References Cited

U.S. PATENT DOCUMENTS

| | | | | |
|---|---|---|---|---|
| 4,708,804 | A * | 11/1987 | Coltrinari | ................. C02F 1/42 |
| | | | | 521/26 |
| 6,200,545 | B1 * | 3/2001 | Dreisinger | .............. C22B 11/08 |
| | | | | 210/903 |
| 6,896,808 | B1 * | 5/2005 | Jay | .......................... C22B 7/006 |
| | | | | 210/651 |
| 6,919,030 | B2 | 7/2005 | Thorpe et al. | |
| 2003/0205533 | A1 * | 11/2003 | Thorpe | ................... B01J 41/05 |
| | | | | 210/665 |

FOREIGN PATENT DOCUMENTS

| | | | |
|---|---|---|---|
| WO | WO 2018/007035 A1 | 1/2018 | |
| WO | WO 2018/068065 A1 | 4/2018 | |
| WO | WO-2019207075 A1 * | 10/2019 | ............. C02F 1/288 |

OTHER PUBLICATIONS

Research Article: Yonghui Song et al, Removal of heavy metals and cyanide from gold mine waste-water by adsorption and electric adsorption, J. Chem. Technol. Biotechnol. 2016, vol. 91, pp. 2539-2544. (Year: 2016).*

Mirat Gurol et al., "The Effect of Copper and Iron Complexation on Removal of Cyanide by Ozone", Ind. Eng. Chem. Res. 1988, vol. 27, pp. 1157-1162. (Year: 1988).*

Chun, Jae-Hun, et al, "Application of the anion-exchange resin as complementary technique to remove residual cyanide complexes in industrial plating wastewater after conventional treatment," Environmental Science and Pollution Research 27 (2020) pp. 41688-41701.

International Search Report for corresponding PCT International Application No. PCT/AU2021/051239, mailed Dec. 2, 2021, 4 pgs.

Kuyucak, Nural, et al, "Cyanide and removal options from effluents in gold mining and mettalurgical processes," Minerals Engineering, 50-51 (2013) pp. 13-29.

Written Opinion of the International Searching Authority for corresponding PCT International Application No. PCT/AU2021/051239, mailed Dec. 2, 2021, 4 pgs.

\* cited by examiner

PROCESS FOR REMOVING CYANIDE FROM A CYANIDE-BEARING AQUEOUS FLUID

RELATED APPLICATIONS

This application is a U.S. National Phase entry under 35 U.S.C. § 371 of International Application No. PCT/AU2021/051239, filed 25 Oct. 2021, which claims the benefit of Australian Patent Application 2020903887, filed 27 Oct. 2020, the content of which is incorporated herein by reference in their entirety.

TECHNICAL FIELD

The invention relates to a process for removing cyanide from an aqueous fluid comprising free cyanide and metal-complexed cyanide. The process comprises dissolving a copper-iron mixed-metal cyanide complex in the aqueous fluid to complex the free cyanide with copper, absorbing the cyanometallates on an anion-exchange absorbent to produce a cyanide-lean aqueous fluid, extracting the copper cyanide and iron cyanide complexes from the anion-exchange absorbent with a non-acidic aqueous extractant, and acidifying the extract to precipitate a copper-iron mixed-metal cyanide complex for optional recycling to the dissolution step. The process is particularly applicable to cyanidation process streams, and it will be convenient to describe the invention primarily in that context.

BACKGROUND OF INVENTION

Cyanidation technology is commonly used to extract gold and other precious metals from precious metal-bearing ores and concentrates. After the leaching process, a tailings solution or slurry is produced which typically contains cyanide in both free and metal-complexed forms. Historically, such streams have been treated with a cyanide detoxification process in which cyanide is chemically destroyed before transfer to a tailings dam for further degradation of any residual cyanide species, but there are now strong environmental and economic incentives to avoid cyanide detoxification and instead recover and recycle cyanide within the process. Moreover, the recovery of metal values from the tailings stream, in particular from dissolved copper cyanide complexes, may also be desirable.

One approach to address at least some of these concerns is dry stacked tailings technology, in which a recyclable cyanidation solution is separated from the tailing solids, the solids are washed with water and then removed from the process as dry tailings. However, to maintain the water balance in the process, a bleed stream at least equivalent to the wash water input is needed. This bleed stream should ideally provide an outlet to limit build-up of detrimental species in the cyanidation process, but should also contain low levels of environmentally harmful cyanide species if recycled within the minerals processing plant or discharged into the environment.

Ion-exchange resin technology has previously been used to recover cyanide species from cyanidation process streams. Strong base ion-exchange resins have excellent absorption capacity for anionic cyanometallate species including copper, iron, nickel, zinc, gold and silver cyanide complexes. Free cyanide, however, is only weakly absorbed. To achieve satisfactory cyanide recovery, it is thus necessary to complex the free cyanide with a metal such as copper before or during the absorption step.

One proposal is to pre-load the ion-exchange resin with cyanide-reactive copper species, e.g. copper cyanide (CuCN), so that free cyanide in the solution to be processed is taken up as anionic copper cyanide complexes, e.g. $Cu(CN)_3^{2-}$ and $Cu(CN)_2^{-}$. The copper cyanide complexes thus formed, together with cyanometallates already present in the solution, are retained on the resin so that a good overall cyanide removal is obtained. For example, the cyanide removal process disclosed in U.S. Pat. No. 6,919,030 involves absorbing anionic copper cyanide species on an ion-exchange resin, eluting a portion of the copper cyanide species from the resin, acid-treating the resultant resin to remove cyanide while retaining the residual copper on the resin, and recycling the acid-treated resin to the absorption step. The acid treatment converts the residual copper cyanide species to cyanide-reactive copper species such as CuCN which take up free cyanide in the absorption step to reform anionic copper cyanide species.

A significant difficulty with this approach is that iron cyanide complexes such as ferrocyanide, i.e. $Fe(CN)_6^{4-}$, may also be present in the solution. Iron and copper cyanometallates have similar affinity for ion-exchange resins, so that both species will be present when a copper cyanide-loaded resin is acid treated. Nickel and zinc cyanide complexes such as $Ni(CN)_4^{2-}$ and $Zn(CN)_4^{2-}$ have very strong absorption affinities and will also remain on the resin. In the presence of iron cyanide complexes, copper, nickel and zinc cyanometallates precipitate under acidic conditions as insoluble mixed-metal cyanide complexes. This can block the pores of the resin, and cause irreversible build-up of metals including the nickel and zinc. A further issue is that repeated acid conditioning can degrade the resin due to osmotic shock and resin breakage.

There is therefore an ongoing need for processes to remove cyanide from a cyanide-bearing aqueous fluid, which at least partially addresses one or more of the above-mentioned short-comings, or provides a useful alternative.

A reference herein to a patent document or other matter which is given as prior art is not to be taken as an admission that the document or matter was known or that the information it contains was part of the common general knowledge as at the priority date of any of the claims.

SUMMARY OF INVENTION

The present invention relies in part on the surprising discovery that iron can be beneficially employed in a cyanide recovery process, in contrast with prior art processes where iron may have detrimental effects. In the process of the invention, free cyanide in the solution to be processed is taken up before contact with an anion-exchange absorbent, by dissolving a copper-iron mixed-metal cyanide complex such as $Cu_2Na_2Fe(CN)_6$ in the solution. The cyanometallates, including the copper and iron cyanide complexes derived from dissolution of the mixed-metal cyanide complex, are then absorbed onto the anion-exchange absorbent. The resultant cyanide-lean treated solution can then be discharged from the process.

The anion-exchange absorbent is then regenerated by extracting the absorbed copper cyanide and iron cyanide complexes under non-acidic extraction conditions. In some preferred embodiments, high extraction efficiencies for both copper and iron are obtained, so that little iron remains on the absorbent. Advantageously, the regeneration process does not require an acid treatment in each cycle, so that physical degradation of the anion-exchange absorbent and precipitation of mixed-metal complexes in the absorbent can be avoided or minimised. The regenerated anion-exchange absorbent thus has a high absorption efficiency in the subsequent cycle, and a long life-time in the process.

The aqueous extract is then acidified to precipitate copper and iron as the copper-iron mixed-metal cyanide complex, which can be recycled to the initial free cyanide absorption step. The presence of iron in the aqueous extract provides the further advantage that copper precipitation, via the formation of the mixed-metal cyanide complex, is readily induced at relatively high pH values even in high ionic strength extract solutions. By contrast, precipitation of copper in the absence of significant quantities of iron requires very low pH values and is inhibited by high concentrations of chloride.

The process of the invention can also accommodate the presence of other cyanometallates in the free cyanide-containing solution to be processed, including nickel and zinc cyanide complexes. Because acid treatment of the resin is not required in each regeneration cycle, these strongly-absorbed cyanometallate species can accumulate gradually on the anion-exchange absorbent through multiple cycles without conversion to insoluble nickel-iron or zinc-iron mixed-metal cyanide complexes. When the accumulated amounts of nickel and zinc species on the absorbent become undesirably high, they can be efficiently extracted via an acid treatment step after first extracting the iron under non-acidic conditions. Because of the low residual iron content, the formation of insoluble nickel-iron and zinc-iron mixed-metal cyanide complexes is avoided or minimised, and the metal cations (i.e. $Ni^{2+}$ and $Zn^{2+}$) report to the acid extract and can be readily treated using conventional methods.

In accordance with a first aspect, the invention provides a process for removing cyanide from a cyanide-bearing aqueous fluid, the process comprising: (i) adding a solid composition comprising a first mixed-metal cyanide complex comprising copper and iron to a cyanide-bearing aqueous fluid comprising free cyanide and metal-complexed cyanide, wherein at least a portion of the first mixed-metal cyanide complex dissolves, with complexation of the copper by the free cyanide, to produce an aqueous solution comprising cyanometallates, the cyanometallates comprising copper cyanide and iron cyanide complexes derived from the first mixed-metal cyanide complex; (ii) contacting the aqueous solution with an anion-exchange absorbent to absorb the cyanometallates, thereby producing a cyanide-lean aqueous fluid; (iii) extracting the anion-exchange absorbent comprising the absorbed cyanometallates with at least one non-acidic aqueous extractant to produce an aqueous extract comprising the copper cyanide and iron cyanide complexes; and (iv) acidifying the aqueous extract to produce a precipitate comprising a second mixed-metal cyanide complex comprising copper and iron.

In some embodiments, the process further comprises recycling at least a portion of the precipitate produced in step (iv) to form at least a portion of the solid composition in step (i).

In some embodiments, the process further comprises adding an iron cyanide complex to the aqueous extract produced in step (iii) before acidifying the aqueous extract in step (iv).

In some embodiments, the aqueous extract is acidified to a pH not lower than 2.5, or not lower than 3, to produce the precipitate.

In some embodiments, the precipitate comprises the second mixed-metal cyanide complex in an amount of at least 50 wt. %, or at least 80 wt. %, or at least 90 wt. %, based on the total solid content of the precipitate.

In some embodiments, the first and second mixed-metal cyanide complexes are copper-ferrocyanide complexes. In some embodiments, the first and second mixed-metal cyanide complexes comprise $Cu_2Na_2Fe(CN)_6$.

In some embodiments, at least 90%, or at least 95%, of the total iron present in the anion-exchange absorbent after step (ii) is extracted into the aqueous extract in step (iii).

In some embodiments, at least 80%, or at least 85%, or at least 90%, such as at least 95%, of the total copper present in the anion-exchange absorbent after step (ii) is extracted into the aqueous extract in step (iii).

In some embodiments, the non-acidic aqueous extractant comprises an anion selected from the group consisting of chloride, bromide, nitrate, thiocyanate, thiosulfate and perchlorate. In some embodiments, the non-acidic aqueous extractant comprises chloride.

In some embodiments, the non-acidic aqueous extractant comprises chloride in an amount of at least 1 mol/litre, or at least 2 mol/litre, such as at least 3 mol/litre.

In some embodiments, the non-acidic aqueous extractant comprises free cyanide.

In some embodiments, the anion-exchange absorbent is recycled after extraction in step (iii) for contact with the aqueous solution in step (ii), wherein the recycled anion-exchange absorbent is not acid treated or is acid treated only after multiple cycles.

In some embodiments, the anion-exchange absorbent is a strong base ion-exchange resin.

In some embodiments, the cyanometallates further comprise copper cyanide and/or iron cyanide complexes derived from the cyanide-bearing aqueous fluid. In some embodiments, the cyanometallates further comprise copper cyanide derived from the cyanide-bearing aqueous fluid.

In some embodiments, the cyanometallates further comprise zinc cyanide and/or nickel cyanide complexes derived from the cyanide-bearing aqueous fluid. In some embodiments, the zinc cyanide and/or nickel cyanide complexes are substantially retained in the anion-exchange absorbent after step (iii).

In some embodiments, the acidified aqueous extract, following precipitation in step (iv), is substantially free of dissolved iron.

In some embodiments, the process further comprises recovering residual copper from the acidified aqueous extract produced in step (iv) by sulfidization.

In some embodiments, the process further comprises recovering free cyanide from the acidified aqueous extract produced in step (iv).

In some embodiments, the process further comprising alkalizing the acidified aqueous extract produced in step (iv) and recycling it to form at least a portion of the non-acidic aqueous extractant in step (iii).

In some embodiments, the cyanide-bearing aqueous fluid comprises a tails stream of a hydrometallurgical cyanidation process.

In some embodiments, at least 95%, preferably at least 99%, more preferably substantially 100%, of the free cyanide is complexed by copper derived from the first mixed-metal cyanide complex in step (i).

Where the terms "comprise", "comprises" and "comprising" are used in the specification (including the claims) they are to be interpreted as specifying the stated features, integers, steps or components, but not precluding the presence of one or more other features, integers, steps or components, or group thereof.

As used herein, the terms "first", "second", "third" etc. in relation to various features of the disclosed devices are arbitrarily assigned and are merely intended to differentiate between two or more such features that the device may incorporate in various embodiments. The terms do not of themselves indicate any particular orientation or sequence. Moreover, it is to be understood that the presence of a "first" feature does not imply that a "second" feature is present, the presence of a "second" feature does not imply that a "first" feature is present, etc.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Figure 1:
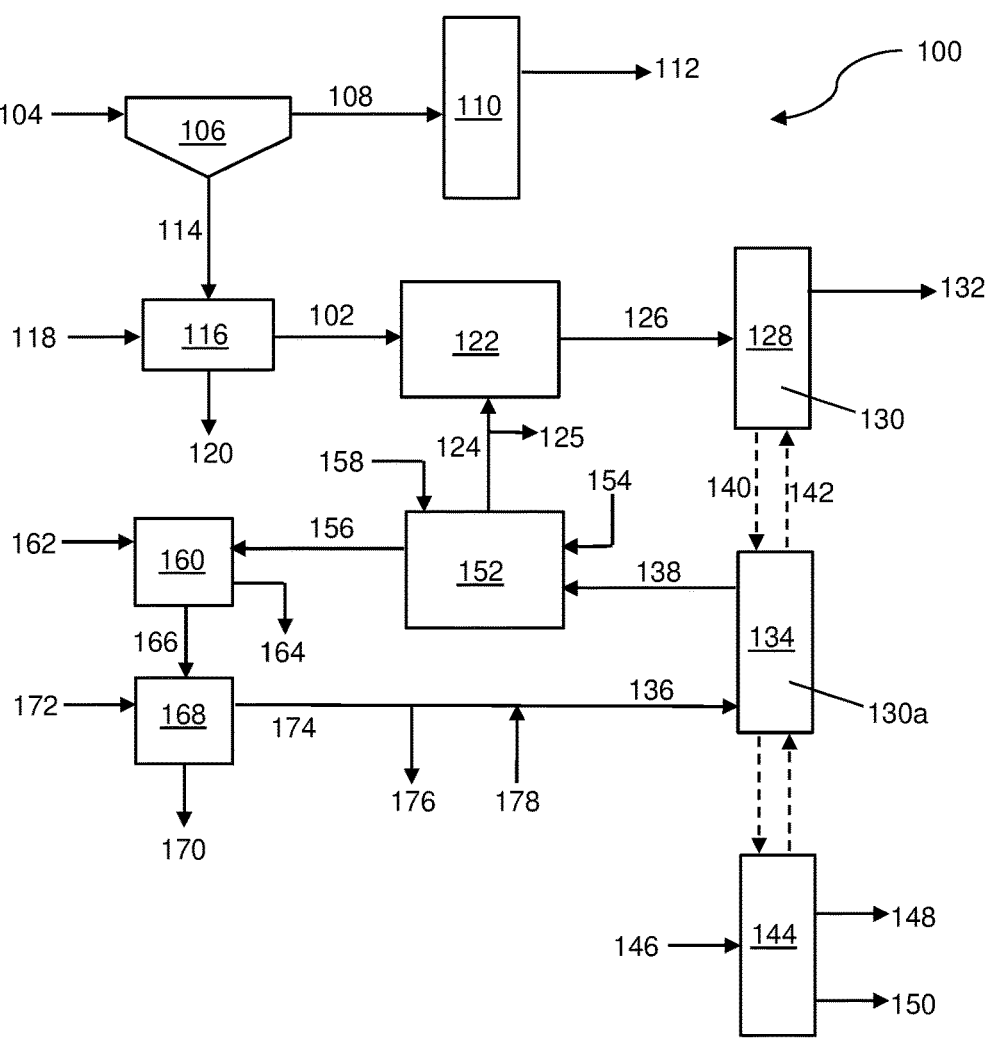
FIG. 1 schematically depicts a process flow scheme for removing cyanide from a cyanide-bearing aqueous fluid according to embodiments of the invention.

The present invention relates to a process for removing cyanide from a cyanide-bearing aqueous fluid comprising free cyanide and metal-complexed cyanide, such as a cyanidation process stream. The process includes a first step of adding a solid composition comprising a copper-iron mixed-metal cyanide complex to the cyanide-bearing aqueous fluid. The mixed-metal cyanide complex dissolves in the aqueous fluid, with its copper component being complexed by the free cyanide in solution. The resultant aqueous solution comprises cyanometallates including copper cyanide and iron cyanide complexes derived from the dissolved mixed-metal cyanide complex together with the metal cyanide complexes that were initially present in the solution.

In a second step, the aqueous solution is contacted with an anion-exchange absorbent to absorb some or all of the cyanometallates and thus produce a cyanide-lean aqueous fluid. The process then includes a third step of extracting the anion-exchange absorbent comprising the absorbed cyanometallates with at least one non-acidic aqueous extractant to produce an aqueous extract comprising the copper cyanide and iron cyanide complexes. One or more other absorbed cyanometallate components, such as nickel and zinc cyanide complexes, may optionally remain adsorbed on the absorbent after the extraction step.

In a fourth step, the aqueous extract is acidified to produce a precipitate comprising a copper-iron mixed-metal cyanide complex. In some embodiments, the precipitate is recycled to the first step to form all or part of the solid composition.

Cyanide-Bearing Aqueous Fluid

The process disclosed herein removes cyanide from a cyanide-bearing aqueous fluid comprising free cyanide and metal-complexed cyanide. The cyanide-bearing aqueous fluid may be a solution or slurry process stream in a hydrometallurgical process, for example a precious metal, e.g. gold, cyanidation process. In some embodiments, it is or comprises a tails stream from a cyanidation process, i.e. the residual solution or slurry remaining after the primary target metal(s) have been removed. While the process is considered particularly applicable in hydrometallurgical processing in mining operations, other cyanide-bearing aqueous fluids may also be treated, for example spent cyanide-containing plating solutions from the metal plating industry.

As used herein, free cyanide refers to cyanide which is not complexed to a metal, and includes cyanide in both the alkaline (deprotonated) form, $CN^-$, and the acidic (protonated) form, HCN. The metal-complexed cyanide may be present in one or more metal cyanide complexes. The terms metal cyanide complex and cyanometallate are used interchangeably in this disclosure. Cyanometallates include at least one cyanide ligand, and commonly cyanide ligands only. The cyanometallates may be anionic.

In some embodiments, the cyanide-bearing aqueous fluid includes one or more selected from copper, iron, nickel, zinc, gold and silver cyanide complexes. In some embodiments, the aqueous fluid includes copper cyanide complexes and/or iron cyanide complexes. In some embodiments, the aqueous fluid includes copper cyanide complexes. Copper is commonly co-leached in cyanidation processes, and the process disclosed herein both uses copper in the removal of free cyanide and optionally allows the recovery of copper values from the fluid.

In some embodiments, the cyanide-bearing aqueous fluid has a neutral or alkaline pH, and the free cyanide and metal complexed cyanide species may be anionic. The counter ions in solution may include common cations such as sodium, potassium and calcium.

Copper-Iron Mixed-Metal Cyanide Complex

The process disclosed herein involves a step of adding a solid composition comprising a mixed-metal cyanide complex comprising copper and iron to the cyanide-bearing aqueous fluid. The solid composition may be, or comprise, a precipitate which is produced subsequently in the process and recycled. The solid composition may contain one or more mixed-metal cyanide complexes, in some embodiments as the main solid component of the composition. However, the solid composition may also include other solid components, including other copper complexes such as copper cyanide (CuCN) and copper thiocyanate (CuSCN).

The solid composition may include a range of different copper-iron mixed metal cyanide complexes. The stoichiometry of these complexes may depend on various factors, such as the composition of the solution from which it was precipitated, and a variety of mixed-metal cyanide complexes comprising copper and iron have previously been reported. Suitable copper-iron mixed-metal cyanide complexes generally have the formula: $Cu_xM_yFe(CN)_6$, where M represents one or more metal cations, $0<x\leq4$, $0\leq y<4$, and x and y are related so that the mixed-metal cyanide complex is neutral, having regard to the oxidation state of the copper, the iron and the metal cations. The copper in the mixed-metal cyanide complex may be in the $Cu^+$ or $Cu^{2+}$ oxidation states, and the iron may be in the $Fe^{2+}$ or $Fe^{3+}$ oxidation states.

Dissolved iron in cyanide solutions is generally present as ferrocyanide, $Fe(CN)_6^{4-}$, or ferricyanide, $Fe(CN)_6^{3-}$, species. These complexes have very high stability constants ($Fe(CN)_6^{3-}:10^{42.3}$; $Fe(CN)_6^{4-}:10^{35.4}$) so that the cyanide does not decomplex under typical hydrometallurgical process conditions and is generally considered irrecoverable. Ferrocyanides (and ferricyanides) form mixed-metal complexes with a variety of metal cations, and many transition metals including copper, nickel and zinc form water-insoluble ferrocyanides (and ferricyanides).

Copper-iron mixed-metal cyanide complexes may be precipitated by acidification of cyanide solutions containing dissolved copper and iron. Under neutral and alkaline conditions, copper is present in anionic copper cyanide complexes such as $Cu(CN)_2^-$, $Cu(CN)_3^{2-}$ and $Cu(CN)_4^{3-}$. When acidified, however, the cyanide decomplexes as HCN, and the resultant free copper cations complex with the stable iron cyanide complexes to precipitate one or more copper-iron mixed-metal cyanide complexes. The composition of the precipitated mixed metal complexes may depend on the process conditions and the presence and concentration of other metal cations in solution. Thus, cuprous ferrocyanide complexes such as $Cu_4Fe(CN)_6$ may be formed, or cupric ferrocyanide complexes such as $Cu_2Fe(CN)_6$ may precipitate under oxidising conditions. When precipitated in the presence of dissolved metal cations, including alkali, alkali earth and transition metals, trimetallic copper-ferrocyanide complexes, such as $Cu_2M'_2Fe(CN)_6$ or $Cu_3M'Fe(CN)_6$, where M'=Na or K, may precipitate.

In some embodiments, the solid composition includes a copper-iron mixed-metal cyanide complex precipitated by acidification of a high salinity eluate, for example comprising $Na^+$ in a concentration of above 1 mol/litre. Without wishing to be limited by any theory, it is believed that the precipitate in such scenarios may include $Cu_2Na_2Fe(CN)_6$.

Free Cyanide Complexation

The solid composition comprising the copper-iron mixed-metal cyanide complex is added to the cyanide-bearing aqueous fluid to deplete free cyanide in the fluid. It does this by dissolving in the aqueous fluid, with the copper being complexed by the free cyanide to form copper cyanide complexes such as $Cu(CN)_2^-$, $Cu(CN)_3^{2-}$ and $Cu(CN)_4^{3-}$. It will be appreciated that the dissolution generally takes place under non-acidic conditions, and preferably under alkaline conditions, which facilitate the complexation of copper by deprotonated $CN^-$. The resultant solution after the dissolution process thus contains copper cyanide and iron cyanide complexes derived from the copper-iron mixed-metal cyanide, as well as the cyanometallates which were already present in the aqueous fluid.

The solid composition may thus be added in an amount suitable to match the copper content available for complexation with the free cyanide content in the aqueous fluid. A suitable ratio of copper to free cyanide to ensure quantitative uptake of free cyanide may be about 3.5. Dissolution may be assisted by agitation, but generally proceeds at ambient temperatures with complexation complete within one hour or less. Preferably, the free cyanide is near-quantitatively or completely removed from the cyanide-bearing aqueous fluid by copper complexation before the absorption step. For example, at least 95%, or at least 99%, or substantially 100% of the free cyanide may be removed.

Absorption

The process disclosed herein involves a step of contacting the aqueous solution with an anion-exchange absorbent to absorb the cyanometallates including the copper and iron cyanide complexes. A cyanide-lean aqueous fluid is thus produced.

Absorption technology to remove cyanometallates from cyanidation process streams is now well-established, and conventional anion-exchange absorbents and absorption process equipment used for such applications may be employed in the process of the present invention. In some embodiments, the anion-exchange absorbent is a basic ion-exchange resin, for example a strong base ion-exchange resin. Such resins typically include porous polymers with absorption sites provided by quaternary amino groups ($—NR_3^+X^-$, where $X^-$ is the exchangeable anion). Suitable strong base ion-exchange resins are known in the art and are commercially available. One example of a suitable resin is Purolite A500/2788.

The process may involve contacting the aqueous solution with ion-exchange resin beads. The beads may be loaded by batch contact with the solution, for example in a resin-in-leach or resin-in-pulp type process. Alternatively, the beads are present in a column, and the aqueous solution may be passed continuously through the column at a suitable flow rate to allow quantitative absorption of the cyanometallates on the absorption sites until the resin is fully loaded. Preferably, the flow is stopped before breakthrough of any cyanide-containing species, so that the resultant cyanide-lean aqueous fluid contains little or no residual cyanide species and may safely be discharged from the process. Because the aqueous solution is depleted of free cyanide before contact with the resin, all the cyanide is generally present in the form of anionic cyanometallates with excellent absorption affinity for the ion-exchange resin. Thus, a high proportion of the absorption sites may be loaded with cyanide-containing species before breakthrough is expected.

It is also envisaged that water-immiscible liquid anion-exchange absorbents may be used, with the absorption step conducted by liquid-liquid extraction techniques. Long-chain alkyl quaternary ammonium salts, such as Aliquat 336, dissolved in hydrocarbon solvents may be used as the liquid anion-exchange absorbent, for example as disclosed in *Int. J. Miner. Metall. Mater.* 2016, 23, 1258.

The absorption step may take place after the dissolution step. However, it is not excluded that the two steps may take place simultaneously, e.g. the solid composition is added to and dissolved in a vessel comprising the aqueous fluid and the anion-exchange absorbent.

Extraction

The process disclosed herein involves a step of extracting the anion-exchange absorbent comprising the absorbed cyanometallates with at least one non-acidic aqueous extractant to remove at least copper and iron. An aqueous extract comprising the extracted copper cyanide and iron cyanide complexes is thus produced. Where the anion-exchange absorbent is a solid absorbent such as an ion-exchange resin, the extraction step may comprise eluting the anion-exchange absorbent with the non-acidic aqueous extractant. The aqueous extractant is thus an eluant and the aqueous extract is an eluate.

In some embodiments, the extraction step removes all or most of the absorbed iron cyanide complexes, and preferably also a high proportion of the absorbed copper cyanide complexes. This ensures that the extracted absorbent has a high capacity for absorption of cyanometallates when recycled to a subsequent absorption step. Moreover, efficient removal of the iron is particularly desirable if intermittent acid regeneration of the absorbent is required to remove strongly absorbed species such as nickel or zinc cyanide complexes. In the presence of iron cyanide complexes, absorbed copper, nickel and zinc may not be removed in an acid regeneration but may instead undesirably precipitate in the absorbent as insoluble mixed-metal cyanide complexes. Residual copper may also precipitate in the absorbent, for example as CuCN, under acidic conditions. In some embodiments, therefore, at least 90%, or at least 95%, or substantially 100%, of the total iron in or on the anion-exchange absorbent is extracted. In some embodiments, at least 80%, or at least 90%, or at least 95%, of the total copper in or on the anion-exchange absorbent is extracted. Any zinc cyanide and/or nickel cyanide complexes may be substantially retained in the anion-exchange absorbent after the extraction, meaning that at least 80%, or at least 90%, remain absorbed.

The non-acidic aqueous extractant (or eluant) and the extraction (or elution) methodology may thus be chosen to provide a high extraction efficiency for the copper and iron cyanide complexes. As used herein, a non-acidic aqueous extractant has a pH sufficiently high to avoid decomplexation of the absorbed copper and other cyanometallates and precipitation of metal species on the absorbent, and is thus distinguished from strongly acidic regeneration eluants. In some embodiments, the pH of the non-acidic aqueous extractant may be greater than about 4.5, or 5, or 6, or 7.

The non-acidic aqueous extractant may comprise a displacement anion, which may be an anion with a relatively lower affinity for the absorbent than the absorbed cyanometallates. Nevertheless, when the displacement anions are provided at sufficiently high concentration in the extractant, the exchange equilibria favour desorption and extraction of at least some of the cyanometallates, including the copper and iron cyanide complexes. After continuous or multi-stage extraction, a high copper and iron extraction efficiency can thus be obtained. After extraction the absorption sites are thus occupied primarily by the displacement anions, with relatively small amounts of residual strongly absorbed metal species such as nickel and zinc cyanide complexes. The absorbent can thus be used in a subsequent absorption cycle.

In some embodiments, the displacement anion is selected from the group consisting of chloride, bromide, nitrate, thiocyanate, thiosulfate and perchlorate. Chloride is a particularly suitable displacement because of its overall compatibility in the process. In some embodiments, the displacement anion, such as chloride, is present in an amount of at least 1 mol/litre, or at least 2 mol/litre, or at least 3 mol/litre.

In some embodiments, the unloaded absorbent may then be treated with a further non-acidic aqueous extractant comprising a different displacement anion (e.g. chloride where other than chloride was used as the first displacement anion) before recycling the absorbent (e.g. in chloride form) to the absorption step. The change in anion on the adsorbent is conducted to improve the adsorption kinetics and recovery of copper and iron cyanide complexes.

In some embodiments, the non-acidic aqueous extractant comprises free cyanide. In some embodiments, the non-acidic aqueous extractant comprises both free cyanide and the displacement anion as disclosed above, for example chloride in an amount of at least 1 mol/litre, or at least 2 mol/litre, or at least 3 mol/litre. It is proposed that the cyanide facilitates the displacement of copper cyanide complexes from strong base ion-exchange resins by converting $Cu(CN)_2^-$ and $Cu(CN)_3^{2-}$ to the more weakly bound $Cu(CN)_4^{3-}$.

In some embodiments, a sequence of non-acidic aqueous extractants is used, with the aim of efficiently extracting the copper and iron cyanide complexes into a small total volume of extractant. For example, a strong base ion-exchange resin may be contacted with a conditioning eluant, for example under static conditions (a pre-soak eluant) or under continuous flow conditions achieved by continuously recirculating the conditioning eluant over the resin, before subsequent continuous elution with a second eluant. In one exemplary embodiment, the resin is conditioned by recirculation or pre-soaking with a high cyanide concentration conditioning eluant, e.g. comprising 1 mol/litre $CN^-$ and 3 mol/litre $Cl^-$, for a time sufficient to predispose the copper cyanide complexes for elution, e.g. for about 2 hours. The resin is then continuously eluted with a low cyanide concentration eluant, e.g. comprising 10 mmol/litre $CN^-$ and 4 mol/litre $Cl^-$, to near-quantitatively elute the copper and iron cyanide complexes. The resin is then washed with water to remove free cyanide before recycling the resin to the absorption step.

In embodiments where the anion-exchange absorbent is a water-immiscible liquid, the copper cyanide and ferrocyanide complexes may be extracted into the non-acidic aqueous extractant with liquid-liquid extraction techniques.

Precipitation

The process disclosed herein involves a step of acidifying the aqueous extract (e.g. eluate) to produce a precipitate comprising a mixed-metal cyanide complex comprising copper and iron.

The precipitate is typically recovered and recycled in the process to form all or part of the solid composition used in the free cyanide-depleting dissolution step. Copper-iron mixed-metal cyanide complexes have already been described in that context, and the same materials are generally precipitated in the precipitation step. The precipitated mixed-metal cyanide complex may thus have the formula: $Cu_xM_yFe(CN)_6$, where M represents one or more metal cations, $0<x\leq4$, $0\leq y<4$, and x and y are related so that the mixed-metal complex is neutral, having regard to the oxidation state of the copper, the iron and the metal cations.

The aqueous extract may be acidified with a mineral acid such as hydrochloric or sulfuric acid to a pH low enough to induce precipitation. One advantage of the disclosed process is that precipitation of copper-iron mixed-metal cyanide complexes can be induced at relatively high pH values, even in high ionic strength extracts. In some embodiments therefore, the aqueous extract is acidified to a pH not lower than 2.5, or not lower than 3, to produce the precipitate.

The precipitate may be composed predominantly, or entirely, of copper-iron mixed-metal cyanide complexes. In some embodiments, the precipitate comprises such complexes in an amount of at least 50 wt. %, or at least 80 wt. %, or at least 90 wt. %, based on the total solid content of the precipitate. Because the copper-iron mixed-metal cyanide complexes are expected to be the first solids precipitated from solution, a high proportion of the desired mixed-metal complexes in the precipitate can be achieved by exercising control over the pH. If the iron content of the aqueous extract is too low to produce sufficient precipitate of the desired composition, an extraneous iron cyanide complex, e.g. $Na_4Fe(CN)_6$, may optionally be dissolved in the aqueous extract before the acidification.

Precipitation may optionally be conducted to substantially deplete the aqueous extract of its iron content. In such embodiments, the acidified aqueous extract is thus substantially free of dissolved iron, meaning that the iron content is below 200 mg/L, or below 100 mg/L. In some embodiments, common for cyanidation process streams, copper will be in excess to iron. Once the iron is depleted, excess copper will tend to precipitate in species such as CuCN or CuSCN, which will thus report to the total precipitate. However, by exercising control of the pH, as discussed above, the co-precipitation of such species with the desired copper-iron mixed metal complexes can be minimised or avoided. Instead, excess copper may remain in solution for recovery in a subsequent process step as will be described hereafter.

The precipitate may be separated from the acidified supernatant by conventional methods such as filtration. The recovered precipitate may be washed, dried, and then recycled to the dissolution step.

Further Processing Steps

The acidified supernatant following the precipitation comprises free cyanide released in the form of HCN from the precipitated copper (in addition to any free cyanide which was already present in the aqueous extract), any residual cyanometallates including unprecipitated copper and/or iron, and anionic components of the extractant such as the displacement anion. The acidified supernatant may then be sent on for further processing and optional recycling to the extraction step.

In one set of embodiments, the acidified extract is sulfidized to recover excess copper as $Cu_2S$. A portion of the free cyanide, for example equivalent to that released from the precipitated and sulfidized copper, is then recovered by conventional cyanide recovery methods, e.g. volatilisation or membrane technology. The resultant copper- and cyanide-lean solution is re-alkalized, e.g. with NaOH. The alkalized solution, containing anionic components such as chloride (or other displacement anion) and remaining free cyanide (in $CN^-$ form) can then be recycled for use as all or part of the aqueous extractant in the extraction step. A purge stream can be taken to avoid build-up of undesirable minor components in the aqueous extractant.

Intermittent Acid Regeneration

As already described, the anion-exchange absorbent after the extraction step may contain residual metal species, for example nickel and zinc cyanide complexes which have strong affinities for absorbents such as strong base anion-exchange resins. In typical cyanidation processes, nickel and zinc are relatively minor components of the total leached metals, so that the retention of these metals on the absorbent after extraction will not prevent the cycling of the absorbent through multiple absorption-extraction cycles. Over time, however, strongly absorbed cyanometallates will build up and an acid regeneration step may be required.

The anion-exchange absorbent may thus be subjected to an intermittent acid treatment, for example with a mineral acid such as $H_2SO_4$ which is capable of removing absorbed nickel and zinc cyanide complexes. HCl may also be effective to remove nickel cyanide complexes.

As disclosed herein, the iron content in the absorbent is preferably very low when acid treating, to avoid the precipitation of nickel-iron or zinc-iron mixed metal cyanide complexes. Thus, acid treatment is generally effected after a thorough extraction with the non-acidic aqueous extractant to deplete the iron and preferably also the copper on or in the absorbent.

Nickel and zinc may be recovered from the acid extract/eluate by conventional means. In one embodiment, a solution containing iron cyanide complexes, for example a portion of the non-acidic aqueous extract, is added to precipitate the nickel and zinc as mixed-metal complexes which can then be recovered by filtration.

Embodiments

The invention will now be described with reference to FIG. 1, which depicts process flow scheme 100 for removing cyanide from a cyanide-bearing aqueous fluid according to embodiments of the invention. Aqueous fluid 102 comprises both free cyanide (as $CN^-$) and metal-complexed cyanide. The metal-complexed cyanide is present in cyanometallates including anionic copper, iron, nickel and zinc cyanide complexes, with the nickel and zinc cyanide complexes present as minor components relative to the copper and iron cyanide complexes. While copper, iron, nickel and zinc cyanometallates are typical components of cyanidation process streams in minerals processing operations, it should be appreciated that the process is not limited to the treatment of aqueous fluids comprising these specific cyanometallates or combinations thereof.

Aqueous fluid 102 may be a process stream in a cyanidation process, for example derived by processing a cyanidation tails slurry which contains residual free cyanide from the cyanidation leaching step, base metal cyanometallates leached from the ore and residual ore solids. As depicted in FIG. 1, tails slurry 104 is clarified in thickener 106 and the clarified tails solution 108 is then optionally processed in ion-exchange absorption unit 110. The absorbent removes the cyanometallates but not the free cyanide, which is poorly absorbed on ion-exchange resins. Clarified tails solution 108 or metal-lean tails solution 112 may then be recycled in the overall cyanidation process, for example to form part of the cyanidation lixiviant.

Underflow 114 of thickener 106 is sent to filter unit 116 where the ore solids are filtered, washed with wash water 118 and discharged from the process as dry tailings 120. The clarified liquid effluent from the filtration unit, comprising the liquid component of underflow 114 and wash water 118, forms aqueous fluid 102. Aqueous fluid 102 thus comprises both free cyanide and metal-complexed cyanide species which were present in cyanidation tails slurry 104, and these species should be removed before fluid 102 can be discharged into the environment or used elsewhere in the minerals processing plant.

The overall process depicted in process flow diagram 100 has the advantage that only a small proportion of cyanidation tails slurry 104 is treated to remove free cyanide. Nevertheless, this may provide sufficient purge capacity to prevent unacceptable accumulation of undesirable soluble components in the cyanidation lixiviant, while also maintaining the overall water balance of the process. While process flow diagram 100 depicts aqueous fluid 102 as a wash/purge stream, as described, it will be appreciated that this is merely an exemplary embodiment and the invention is generally applicable to the treatment of cyanide-bearing aqueous fluids comprising both free and metal-complexed cyanide species.

Aqueous fluid 102 is sent to dissolution unit 122 where solid composition 124 is added to the fluid. During continuous operation, solid composition 124 is a recycled precipitate as will be explained hereafter. Solid composition 124 includes a copper-ferrocyanide mixed-metal complex, such as $Cu_2Na_2Fe(CN)_6$, and the addition of the solid composition is controlled so that the copper content is sufficient to complex all free cyanide in aqueous fluid 102. The copper-ferrocyanide mixed-metal complex dissolves in the fluid, with complexation of copper by the free cyanide, to form dissolved copper cyanide and ferrocyanide complexes. Aqueous fluid 102 may be agitated in the dissolution unit vessel to ensure good mixing, and is retained for a sufficient time (or a sufficient residence time in a continuous process) to allow dissolution and complexation of free cyanide with the dissolved copper.

The resultant aqueous solution 126 thus contains little or no free cyanide, but contains cyanometallate species including the copper cyanide and ferrocyanide complexes derived from the dissolved copper-ferrocyanide mixed-metal complex, as well as the initial copper, iron, nickel and zinc cyanide complexes that were present in aqueous solution 102.

Aqueous solution 126 is then sent to absorption unit 128 where it is contacted with an anion-exchange absorbent 130 so that the cyanometallates are absorbed onto the absorbent. The resultant cyanide-lean aqueous fluid 132 is then discharged from the process, or recycled for example as wash water 118. Cyanide-lean aqueous fluid 132 advantageously has a low content of both free and metal-complexed cyanide, since the free cyanide was already depleted in feed solution 126 and the cyanometallates are strongly absorbed on the anion-exchange absorbent 130.

Absorbent 130 may be a strong base ion-exchange resin, for example in resin beads. Aqueous solution 126 may be passed continuously through a column of the resin until the absorption capacity of the resin is near-exhausted (i.e. until shortly before breakthrough of the cyanometallates is expected).

Cyanometallate-loaded anion-exchange absorbent 130a, as produced in absorption unit 128, is then subjected to extraction in extraction unit 134 with non-acidic aqueous extractant 136, comprising a solution of free cyanide ($CN^-$) and chloride ($Cl^-$). The absorbed copper cyanide and ferrocyanide complexes are thus extracted from the loaded absorbent into aqueous extract 138. It is preferred that a high proportion of the copper cyanide and ferrocyanide complexes are extracted from the absorbent, and a cyanide-chloride extractant solution has been found particularly effective to achieve this goal. However, other non-acidic aqueous extractant compositions may be used provided that they are capable of desorbing and extracting the copper and iron cyanide complexes.

Prior to the extraction step, loaded absorbent 130a may be transferred to a separate extraction vessel, as represented by dotted arrow 140 in FIG. 1, where the extraction takes place. Alternatively, however, the absorbent is maintained in the same vessel, e.g. a resin column, through both the absorption and extraction steps. Absorption unit 128 and extraction unit 134 may thus comprise the same process equipment, with the absorbent cycled in situ between absorption and extraction cycles (as represented in this case by dotted arrows 140 and 142).

In embodiments where anion-exchange absorbent 130 is a strong base ion-exchange resin, eluant 136 may be passed continuously through a column of the loaded resin to elute the copper cyanide and ferrocyanide complexes, thereby producing aqueous eluate 138.

Once the copper cyanide and ferrocyanide complexes have been extracted from anion-exchange absorbent 130a in extraction unit 134, the barren absorbent is cycled back to absorption unit 128 where it is again used to absorb cyanometallates from aqueous solution 126. In this manner, anion-exchange absorbent 130 may be recycled repeatedly between absorption and extraction steps.

Nickel and zinc cyanide complexes have a higher affinity for certain anion-exchange absorbents than copper cyanide and ferrocyanide complexes, and thus in at least some embodiments the nickel and zinc cyanide complexes present in aqueous solution 126 are predominantly or entirely retained on absorbent 130a after the extraction step. Aqueous extract 138 thus contains little or no nickel and zinc. However, as the nickel and zinc species were relatively minor components in aqueous fluid 102, the retention of these species does not substantially impair the absorption capacity of absorbent 130 until it has passed through multiple absorption-extraction cycles.

If the level of absorbed nickel and zinc cyanometallate species does exceed an undesirable level after multiple cycles, anion-exchange absorbent 130 may be subjected to an acid extraction in acid regeneration unit 144, using acid 146, for example sulfuric or hydrochloric acid. Once again, the absorbent may be physically transferred to a separate vessel for the acid regeneration step, or retained in the same vessel for intermittent in situ acid treatment. In either case, because the acid extraction step is performed after the non-acidic extraction with aqueous extractant 136, the absorbent contains little or no residual copper cyanide and iron cyanide complexes when acidified. Under these conditions, the decomplexed nickel and zinc cations desorb and are extracted into the acidic extract 148. Free cyanide 150, released as HCN under the acidic conditions, may be recovered from the acid regeneration unit by conventional means.

The acid regenerated absorbent 130, now containing very low levels of absorbed metal species, is then returned to absorption unit 128 and extraction unit 134 for further absorption and extraction cycles. Depending on the amount of nickel and zinc in aqueous fluid 102, it is expected that many cycles of absorption and extraction can be conducted before an acid regeneration step is required. Advantageously, the lifetime of the absorbent may thus be extended as it is not subjected to regular switching between neutral/alkaline and highly acidic conditions.

After non-acidic extraction in extraction unit 134, aqueous extract 138 comprising the extracted copper cyanide and ferrocyanide complexes is sent to precipitation unit 152. There, the aqueous extract is acidified with acid 154, causing the formation of precipitate 124. Precipitate 124 comprises a copper-ferrocyanide mixed-metal cyanide complex, such as $Cu_2Na_2Fe(CN)_6$, as at least one component. In some embodiments, such compounds as the predominant or only component: copper-iron mixed-metal cyanide complexes are expected to be the first copper-containing species to precipitate from copper- and iron-containing cyanide solutions when the pH is reduced. However, excess copper may precipitate as CuCN (or CuSCN) if the pH is low enough, and it is not excluded that precipitate 124 also contains such species.

The formation of precipitate 124 is accompanied by release of free cyanide from the copper. The free cyanide remains in the acidic supernatant stream 156 in the form of HCN. Solid precipitate 124 is separated from supernatant stream 156, for example by filtration, and recycled to dissolution unit 122 where it dissolves and complexes the free cyanide in aqueous fluid 102 as disclosed herein. The iron and copper present in the precipitate thus cycle repeatedly between dissolution unit 122, absorption unit 128, extraction unit 134 and precipitation unit 152.

If the amount of iron in aqueous extract 138 is insufficient to precipitate a copper-iron mixed-metal cyanide complex as a substantial component of precipitate 124, a supplementary iron cyanide complex 158, e.g. $Fe(CN)_6^{4-}$, may optionally be added to precipitation unit 152, dissolving it in aqueous extract 138 prior to acidification. This may be required, for example, when starting up the process if the iron: copper ratio in aqueous fluid 102 is too low. Over time, however, the amount of iron in the process cycle is expected to build up as copper-iron mixed-metal cyanide complexes are preferentially precipitated and further iron enters the process via aqueous fluid 102. Ongoing supplementation of iron cyanide complex 158 will therefore not be required.

When copper is in excess in aqueous extract 138, the precipitation step can be controlled via the pH to quantitatively precipitate iron while leaving the excess copper dissolved in the supernatant stream. This selectivity control is assisted by the predictability and fast kinetics of copper-iron mixed-metal cyanide complex precipitation compared to copper compounds such as CuCN. Excess precipitate 124 not required in dissolution unit 122 may then be discarded via waste stream 125, providing an outlet for the iron entering the process with aqueous fluid 102. Alternatively, all precipitate 124 may be added to dissolution unit 122, with the undissolved excess separated and purged in the dissolution or absorption steps.

In the less typical scenario where iron is in excess in aqueous extract 138, all copper can be precipitated as copper-iron mixed-metal cyanide complexes in precipitate 124. Copper entering the process in stream 102 can thus be removed via waste stream 125. The residual iron in supernatant stream 156 may be purged (iron cyanide complexes are not considered toxic) or used to precipitate nickel and zinc from acidic extract 148.

Acidic supernatant stream 156, containing residual copper cyanide complexes (and any residual iron cyanide complexes), free cyanide (originating both from aqueous extractant 136 and released from copper in the precipitation unit 152) and chloride (originating from aqueous extractant 136) is then sent to sulfidation unit 160. There, sulfide 162 (as sodium sulfide) is added to precipitate the residual copper as copper sulfide and release the associated cyanide. Copper sulfide product 164 is separated and recovered, and can be sold to recover the copper value of aqueous fluid 102. The resultant copper-lean solution 166 is then sent to cyanide processing unit 168, where a portion of the free cyanide is volatilised and removed as gaseous HCN via gas stream 170 (and which can be adsorbed into a caustic solution to generate an alkaline cyanide solution for use elsewhere in the plant). The residual solution is then alkalised by addition of sodium hydroxide 172 to convert the remaining free cyanide from the acidic form (HCN) to the alkaline form (CN). Alkalised stream 174, containing free cyanide (CN⁻) and chloride (Cl⁻), is then recycled to form at least a part of non-acidic aqueous extractant 136, purging via stream 176 and supplementing with make-up extractant solution 178 as required.

Figure 2:
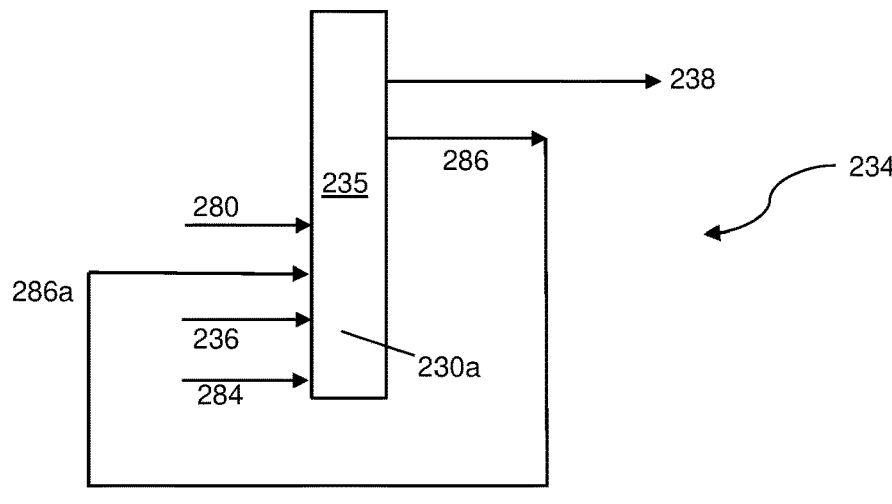
FIG. 2 schematically depicts an elution unit for extracting an anion-exchange absorbent with non-acidic aqueous extractant according to embodiments of the invention.

The elution step of another embodiment of the invention will now be described with reference to FIG. 2, which depicts elution unit 234. Elution unit 234 may be part of an overall process such as process flow scheme 100 described above. Elution unit 234 includes elution column 235 containing strong base ion-exchange absorbent 230a, which has been loaded with copper, iron, nickel and zinc cyanometallates via an absorption step as disclosed herein. To initiate the elution step, absorbent 230a is subjected to a conditioning step in the form of a pre-elution soak with pre-eluant 280 (a conditioning eluant). Pre-eluant 280 contains free cyanide (CN⁻) and chloride (Cl⁻). The free cyanide and chloride concentrations may be relatively high, for example the cyanide concentration may be above 0.5 mol/litre, or above 1 mol/litre, and the chloride concentration may be above 1 mol/litre, or above 2 mol/litre, or about 3 mol/litre or higher. Pre-eluant 280 is loaded in an amount of less than one bed volume (BV), for example 0.5 BV, such that all the ion exchange resin is in contact with pre-eluant 280, and the pre-eluant is allowed to contact the absorbent for a suitable soak time, for example between 1 and 3 hours. The high concentrations of cyanide and chloride in the soak assist to desorb the copper and iron cyanometallates, thus allowing effective elution of these species into a smaller total volume of eluate. As an alternative, the conditioning step can be conducted by continuously recirculating pre-eluant 280 through absorbent 230a for a time sufficient to condition the copper and iron cyanometallates for desorption in the subsequent main elution step.

After the static or continuous conditioning step, absorbent 230a is continuously eluted by passing eluant through column 234 as a suitable flow rate, for example about 2 BV/hour. The continuous elution is performed sequentially with eluant 286a, an internally recycled elution stream containing a low copper content, and then eluant 236. Eluant 236, which is preferably essentially free of copper, may comprise solution 136 obtained by an external recycle via precipitation, sulfidation and cyanide recovery steps, as disclosed herein with reference to FIG. 1. A first fraction of the eluate, eluate fraction 238 (which will typically comprise at least pre-eluant 280 and a portion of eluant 286a), is recovered from column 235 and sent to the precipitation step, as disclosed herein. A subsequent fraction, eluate fraction 286, is internally recycled within elution unit 234 to form eluant 286a.

The volume of eluate fraction 238 is selected to ensure that this fraction contains most of the total copper and iron cyanide complexes desorbed from the ion-exchange resin, while minimising the total volume of eluate sent for further processing. Because the copper elution profile from ion-exchange resins may exhibit a long tail of low concentration copper after the primary copper elution peak, a small proportion of the total copper cyanide complexes may report to eluate fraction 286. However, it may be more efficient to internally recycle this fraction as eluant 286a than to dilute the eluate sent for further processing via the precipitation unit. It will be appreciated that the optimised absolute and relative volumes of eluate fractions 238 and 286 will be implementation specific. In one exemplary embodiment, the first 5 BVs of the elution are taken via eluate fraction 238 to the precipitation step, while the subsequent 6 BVs are recycled via eluate fraction 286.

After the elution with eluant 282, absorbent 230a is washed with water 284, for example in an amount of 0.5 BV. The unloaded ion-exchange resin 230 can then be returned to an absorption step, or an intermittent acid regeneration step, as described.

EXAMPLES

The present invention is described with reference to the following examples. It is to be understood that the examples are illustrative of and not limiting to the invention described herein.

Example 1

A series of aqueous solutions were prepared having the compositions shown in Table 1 below.

TABLE 1

| Solution | Composition | Note |
|---|---|---|
| 1-1 | 5 mM free $CN^-$ + 5 mM $SCN^-$ + 1 mM copper $[Cu(CN)_3^{2-}]$ + 1 mM iron $[Fe(CN)_6^{3-}]$ + 1 mM zinc $[Zn(CN)_4^{2-}]$ + 1 mM nickel $[Ni(CN)_4^{2-}]$ | Solution contains free cyanide |
| 1-2 | 5 mM $SCN^-$ + 3.5 mM copper $[Cu(CN)_3^{2-}]$ + 1 mM iron $[Fe(CN)_6^{3-}]$ + 1 mM zinc $[Zn(CN)_4^{2-}]$ + 1 mM nickel $[Ni(CN)_4^{2-}]$ | Prepared by dissolving CuCN in solution 1 to complex the free $CN^-$ |
| 1-3 | 5 mM $SCN^-$ + 10 mM copper $[Cu(CN)_3^{2-}]$ + 1 mM iron $[Fe(CN)_6^{3-}]$ + 1 mM zinc $[Zn(CN)_4^{2-}]$ + 1 mM nickel $[Ni(CN)_4^{2-}]$ | |

Absorption tests using solutions 1-1, 1-2 and 1-3 were performed using a strong base ion-exchange resin (Purolite A500/2788) loaded into an 8 mL resin column coupled with a fraction collector. 100 bed volumes (BVs) of the test solution were pumped through the resin column at 5 BV hr$^{-1}$, with 1 BV fractions collected by the fraction collector. One sample out of every five fractions was subjected to metal analysis by ICP, thiocyanate analysis by HPLC and free cyanide analysis (if required) by potentiometric titration with silver nitrate. Upon completion of the column adsorption, a resin sample (~1 mL) was taken for resin stripping (two×30 minute, agitated extractions into 50 mL of 0.5 M perchlorate solution) to determine the loading of various species on the resin.

Figure 3:
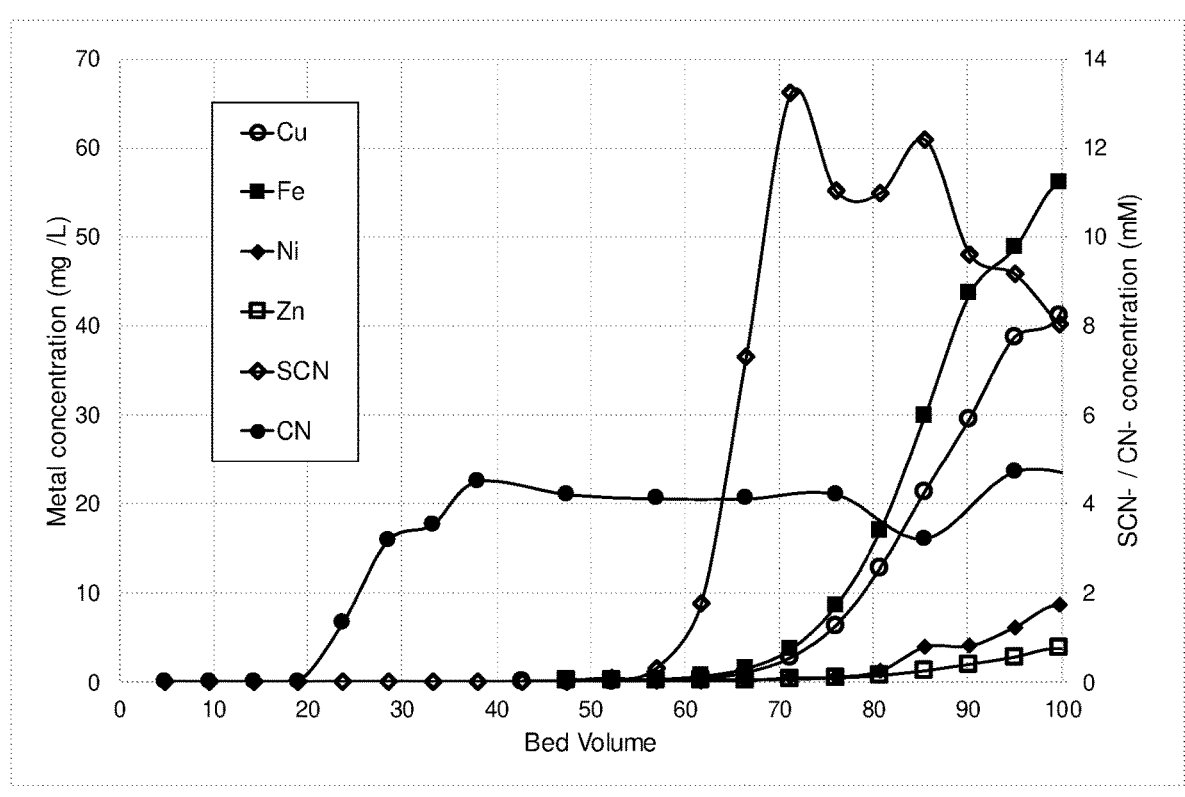
FIG. 3 shows the absorption profile for an aqueous solution comprising free cyanide and copper, iron, nickel and zinc metal cyanide complexes on a strong base ion-exchange resin, as obtained in Example 1.
Figure 4:
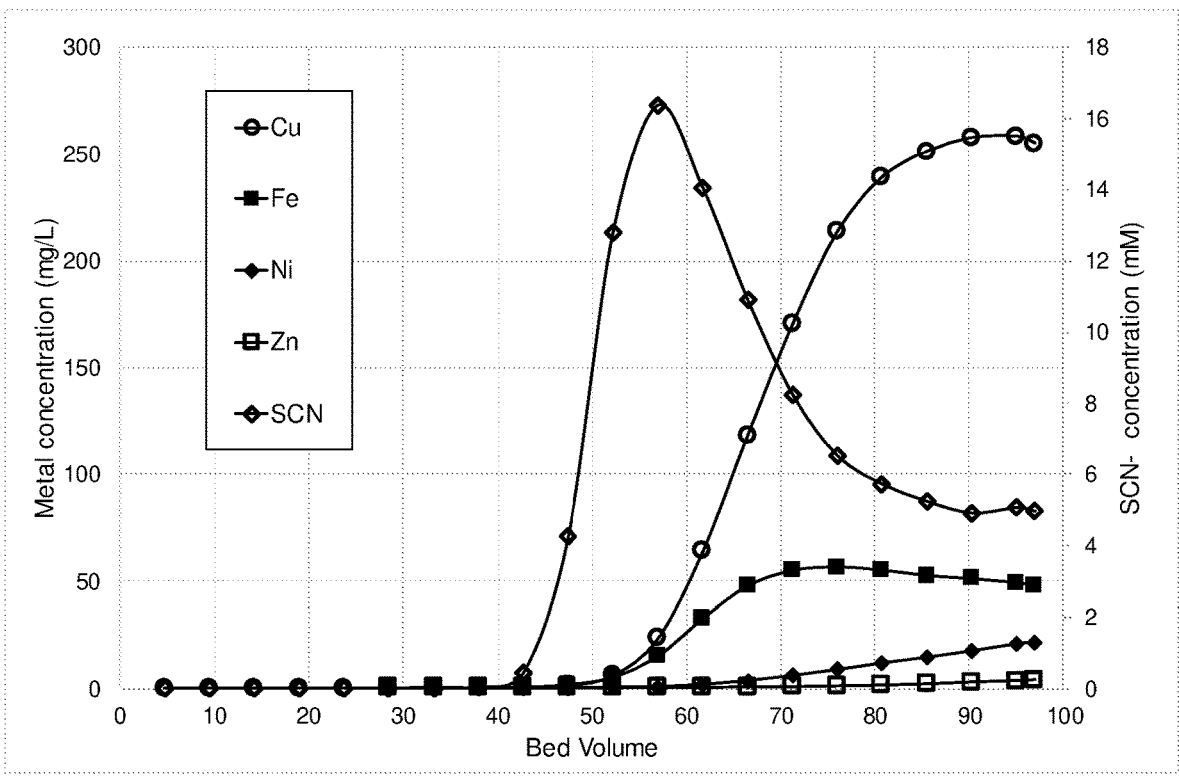
FIG. 4 shows the absorption profile for an aqueous solution comprising copper, iron, nickel and zinc metal cyanide complexes on a strong base ion-exchange resin, as obtained in Example 1.
Figure 5:
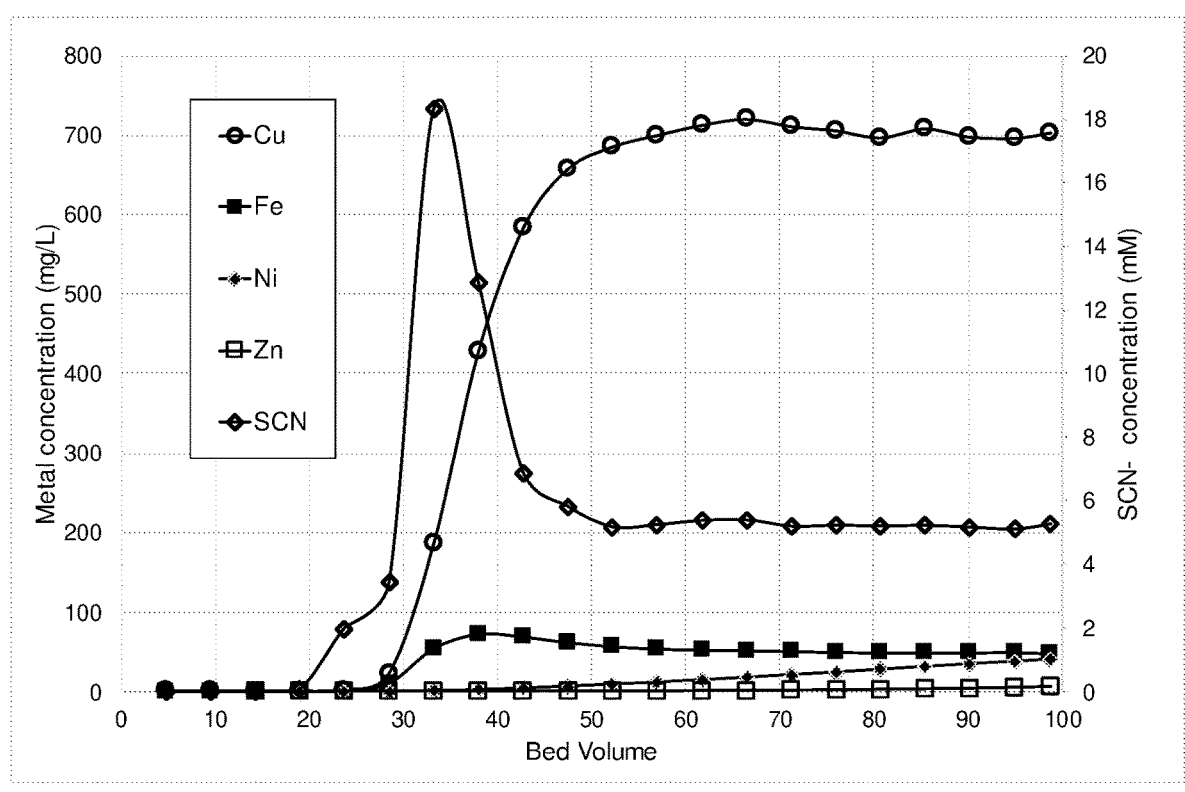
FIG. 5 shows the absorption profile for another aqueous solution comprising copper, iron, nickel and zinc metal cyanide complexes on a strong base ion-exchange resin, as obtained in Example 1.

The resin absorption profiles of solutions 1-1, 1-2 and 1-3 are shown in FIGS. 3, 4 and 5 respectively. With solution 1-1, the free cyanide broke through early (20 BV's), consistent with its expected weak affinity toward resin absorption. Copper and iron cyanides broke through simultaneously at 64 BV's, reflecting their relatively strong absorption, while nickel and zinc cyanide did not break through until ~80 BVs. Thiocyanate broke through at 58 BV and increased immediately to above the feed concentration (5 mM), indicating a desorption process occurring due to the competitive adsorption of other more strongly adsorbed species.

Solution 1-2 was prepared by dissolving CuCN in solution 1-1 until no free cyanide remained. As a result, the copper cyanide concentration was higher than solution 1-1 (3.5 mM vs 1 mM). As seen in FIG. 4, no free cyanide was detected in the collected fractions. Thus, copper and iron cyanides were the first cyanide-containing species to break through, at about 50 BV. Solution 1-3 contained a higher copper cyanide concentration than 1-2 (10 mM vs 3.5 mM); accordingly the copper breakthrough occurred earlier (28 BV's) as the resin capacity was reached faster (FIG. 5). Nickel and zinc were absorbed strongly for both solutions 1-2 and 1-3.

Example 2

A strong base ion-exchange resin (Purolite A500/2788) was loaded by contacting it with solution 1-2 (from example 1) in a batch process overnight. The loaded resin was rinsed and transferred to an 8 mL column. The resin was then eluted using various elution regimes at a flow rate of 2 BV hr$^{-1}$ and ambient temperature. 1 BV solution samples were collected using a fraction collector and analysed for metal species using ICP and thiocyanate using HPLC. A sample of the barren resin was stripped to determine the residual loading of various species on the barren resin. The elution regimes investigated were as follows:

Elution 2-1. (1) Resin presoak with 0.5 BV of 3 M NaCl+1 M NaCN solution for 2 hours, (2) elution with 4 M NaCl+10 mM NaCN solution at 2 BV hr$^{-1}$.

Elution 2-2. (1) Resin presoak with 0.5 BV of 3 M NaCl+1 M NaCN solution for 2 hours, (2) elution with 8 BVs of 4 M NaCl+10 mM NaCN solution at 2 BV hr$^{-1}$, (3) wash with 1 BV water at 2 BV hr$^{-1}$, (4) elution with 8 BVs of 1 M $H_2SO_4$ solution.

Elution 2-3. (1) Elution with 8 BVs of 0.2 M NaCN solution at 2 BV hr$^{-1}$, (2) wash with 1 BV water at 2 BV hr$^{-1}$, (3) elution with 8 BVs of 1 M $H_2SO_4$ solution.

Elution 2-4. (1) Resin presoak with 0.5 BV of 3 M NaCl+1 M NaCN solution for 2 hours, (2) elution with 8 BVs of 4 M NaCl+10 mM NaCN solution at 2 BV hr$^{-1}$, (3) wash with 1 BV water at 2 BV hr$^{-1}$, (4) elution with 8 BVs of 2 M HCl solution.

Figure 6:
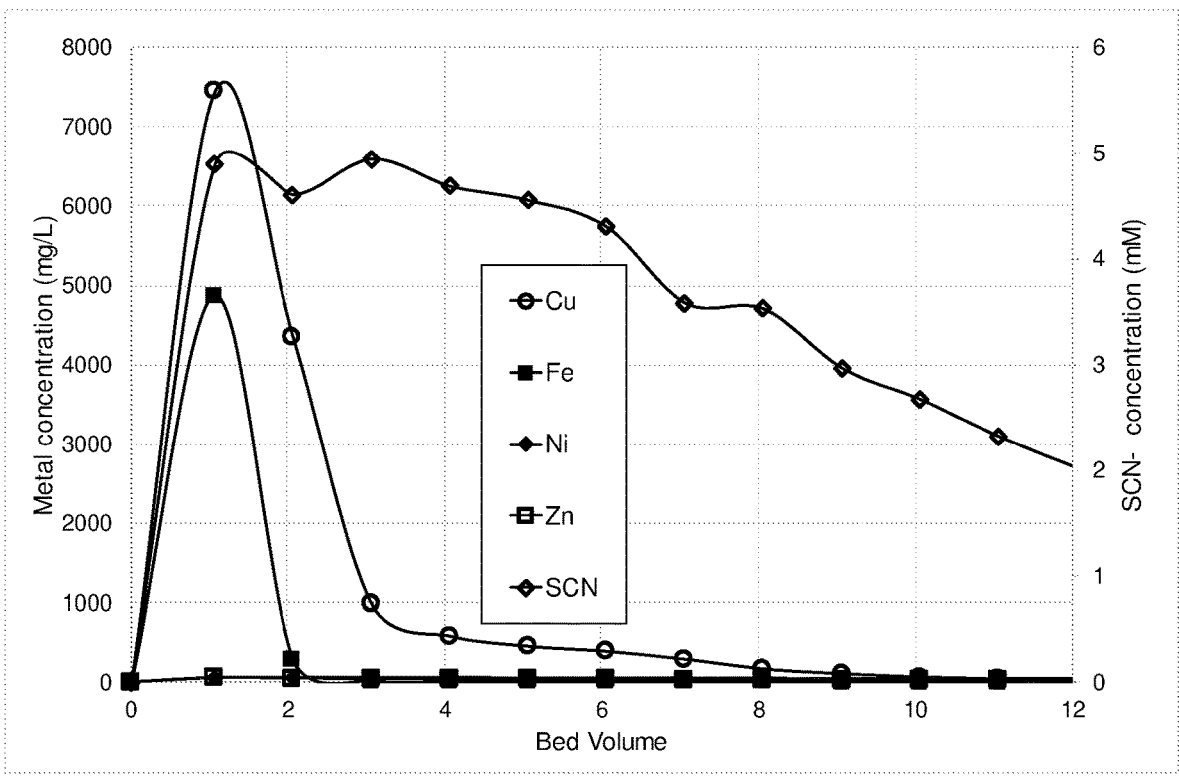
FIG. 6 shows an elution profile from a strong base ion-exchange resin loaded with copper, iron, nickel and zinc metal cyanide complexes using a cyanide-chloride non-acidic eluant, as obtained in Example 2.
Figure 7:
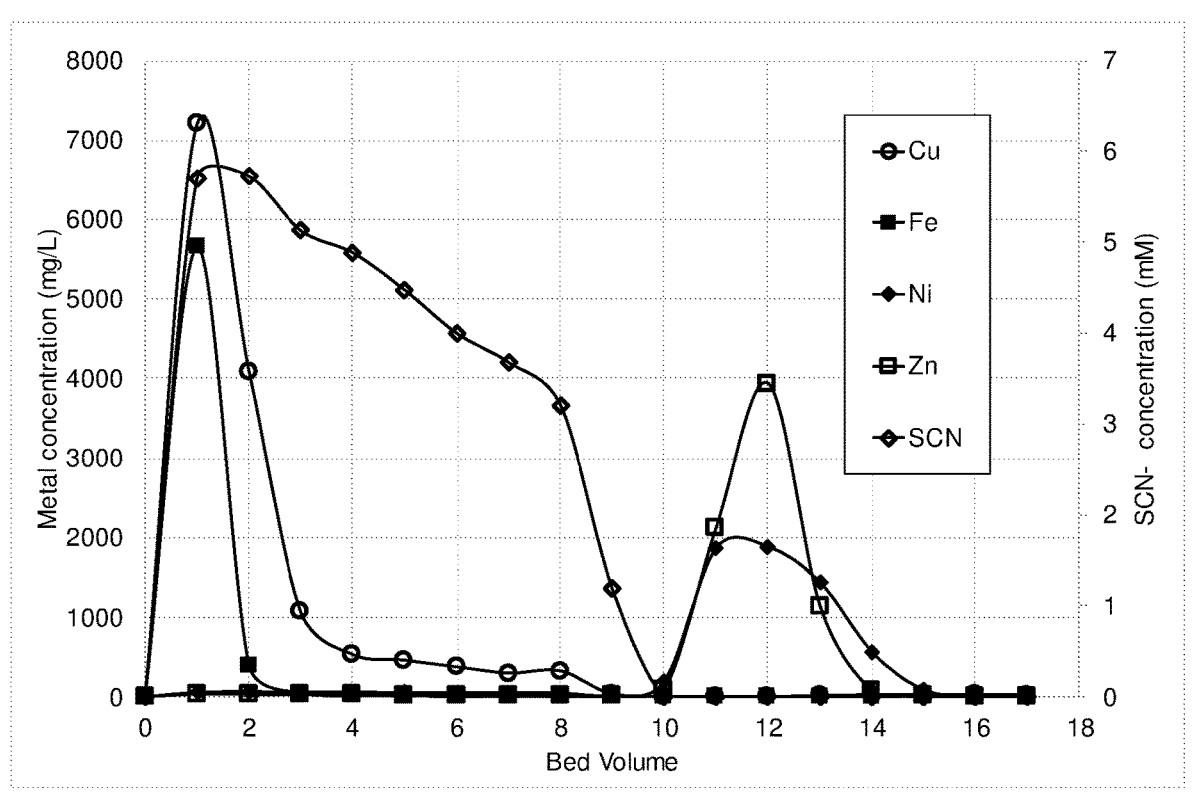
FIG. 7 shows an elution profile from a strong base ion-exchange resin loaded with copper, iron, nickel and zinc metal cyanide complexes using a cyanide-chloride non-acidic eluant followed by an acid eluant, as obtained in Example 2.
Figure 8:
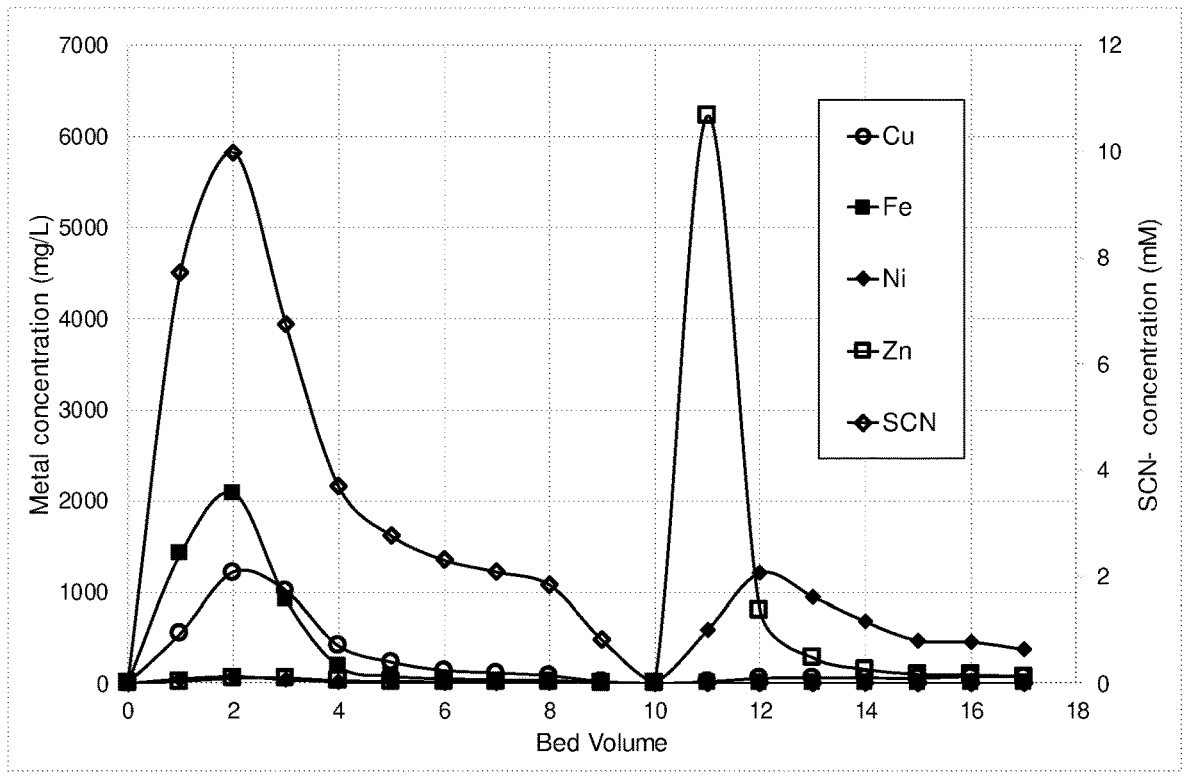
FIG. 8 shows an elution profile from a strong base ion-exchange resin loaded with copper, iron, nickel and zinc metal cyanide complexes using a cyanide non-acidic eluant followed by an acid eluant, as obtained in Example 2.

The results are shown in Table 2 and in FIGS. 6, 7 and 8. Elution method 2-1, which used a combination of free cyanide and chloride, was very effective in eluting copper and iron. A sharp peak in the elution profile indicates that the elution of iron was essentially complete in 2 BVs and the majority of copper was eluted in 3 BVs (FIG. 6). At the end of the elution with 12 BVs of eluant, the elution efficiency was 99% for both copper and iron (Table 2). Elution method 2-1 was ineffective in eluting nickel and zinc (elution efficiency of 7% and 2% respectively).

TABLE 2

| | Resin sample | Cu (g/t) | Fe (g/t) | Ni (g/t) | Zn (g/t) | SCN (mM) |
|---|---|---|---|---|---|---|
| Loaded resin | Loaded resin | 39302 | 13064 | 18464 | 21156 | 159 |
| Elution 2-1 | Barren resin | 413 | 191 | 17112 | 20809 | 7 |
| | Elution efficiency | 99% | 99% | 7% | 2% | 96% |
| Elution 2-2 | Barren resin | 641 | 157 | 107 | 33 | 14 |
| | Elution efficiency | 98% | 99% | 99% | 100% | 91% |
| Elution 2-3 | Barren resin | 22441 | 2730 | 3447 | 1508 | 16 |
| | Elution efficiency | 43% | 79% | 81% | 93% | 90% |

Elution method 2-2 included an initial cyanide/chloride elution similar to method 2-1, but was followed by an acid elution step with $H_2SO_4$. As seen in FIG. 7, copper, iron and thiocyanate were effectively eluted in the initial elution step, while the nickel and zinc were eluted in the acid elution step. As a result, near-quantitative elution of all metal components was achieved after the procedure (Table 2). The barren resin was visually identical to the fresh resin.

Elution method 2-3 employed an initial cyanide elution step (no chloride component) followed by an acid elution step. As seen in FIG. 8, copper and iron peaks were observed during the cyanide elution, but elution of these components was incomplete (compare peak sizes with FIG. 6). During the acid elution step, a sharp peak for zinc and a relatively wide peak for nickel were observed. The post-elution resin analysis revealed poor elution efficiencies for all components. Only 43% of the copper and 70% of the iron were removed, despite the addition of 3 times the cyanide compared to that used in method 2-1 (8 BVs of 0.2 M NaCN vs. 0.5 BV of 1 M NaCN). The results highlight the role of chloride in enhancing the elution of copper and iron cyanides. Moreover, only 93% of zinc and 81% of nickel were eluted, despite the use of the same acid treatment which quantitatively eluted these components in method 2-2. It is proposed that the presence of residual copper and iron in the resin resulted in the formation of CuCN and insoluble mixed-metal ferrocyanide complexes (containing copper, zinc and nickel) during the acid treatment step. The barren resin was discoloured, consistent with the retention of insoluble metal complexes.

Elution method 2-4 was identical to method 2-2, except that HCl instead of $H_2SO_4$ was used in the acid elution step. As expected, the copper and iron were quantitatively eluted in the initial cyanide/chloride elution. In the acid elution step, nickel was quantitatively eluted. However, elution efficiency for zinc was low, with 93% of the remaining in the barren resin. This is likely due to the formation of zinc chloride anion complexes (e.g. $ZnCl_3^-$ and $ZnCl_4^{2-}$) in the presence of strong HCl (2M), which remained adsorbed on the resin.

Example 3

A synthetic aqueous copper cyanide eluate solution (3-1) was prepared containing 30 mM of Cu at a Cu:CN ratio of 1:3.5 (solution prepared with 30 mM CuCN and 75 mM NaCN). The expected copper cyanide complexes are $Cu(CN)_3^{2-}$ and $Cu(CN)_4^{3-}$. A second solution (3-2) was prepared with the same components, but in addition with 4 M chloride concentration (added as NaCl).

Copper precipitation experiments were conducted using a 100 ml reactor coupled to a gas scrubber containing 0.5 M NaOH solution. The reactor and scrubber were sealed and operated under a slight negative pressure so that the hydrogen cyanide gases were captured in the scrubber. Solutions 3-1 or 3-2 were transferred to the reactor (100 mL) and acidified by adding 1 M sulfuric acid with a Dosimat to reduce the pH of the solution to desired pH values in stages. At each pH stage, the precipitation reaction was allowed to occur for 10 minutes before a sample was taken for the analysis of various species. Upon completion of the test, the pH was adjusted to above 11 by NaOH addition before waste disposal. The results can be seen in FIG. 9.

In the absence of chloride, more than 80% of the copper had precipitated by pH 3.5, and copper cyanide (CuCN) precipitation was substantially complete at a pH of 2. However, the presence of high concentrations of chloride (as used in elution methods 2-1 and 2-2, Example 2) delayed the precipitation of CuCN until a significantly lower pH was reached. The copper was still not quantitatively precipitated at a pH of 1.5. This was ascribed to the strong ionic strength shifting the overall copper cyanide speciation towards aqueous copper cyanide species rather than CuCN precipitate.

Example 4

A synthetic aqueous cyanide eluate solution (4-1) was prepared containing 30 mM of Cu at a Cu:CN ratio of 1:3.5 and 10 mM of ferrocyanide, i.e. the iron(II) complex $Fe(CN)_6^{4-}$ (solution prepared with 30 mM CuCN, 75 mM NaCN and 10 mM $Na_4Fe(CN)_6$). A further synthetic aqueous cyanide solution (4-2) was prepared containing 30 mM of Cu at a Cu:CN ratio of 1:3.5 and 10 mM of ferricyanide, i.e. the iron(III) complex $Fe(CN)_6^-$.

Figure 9:
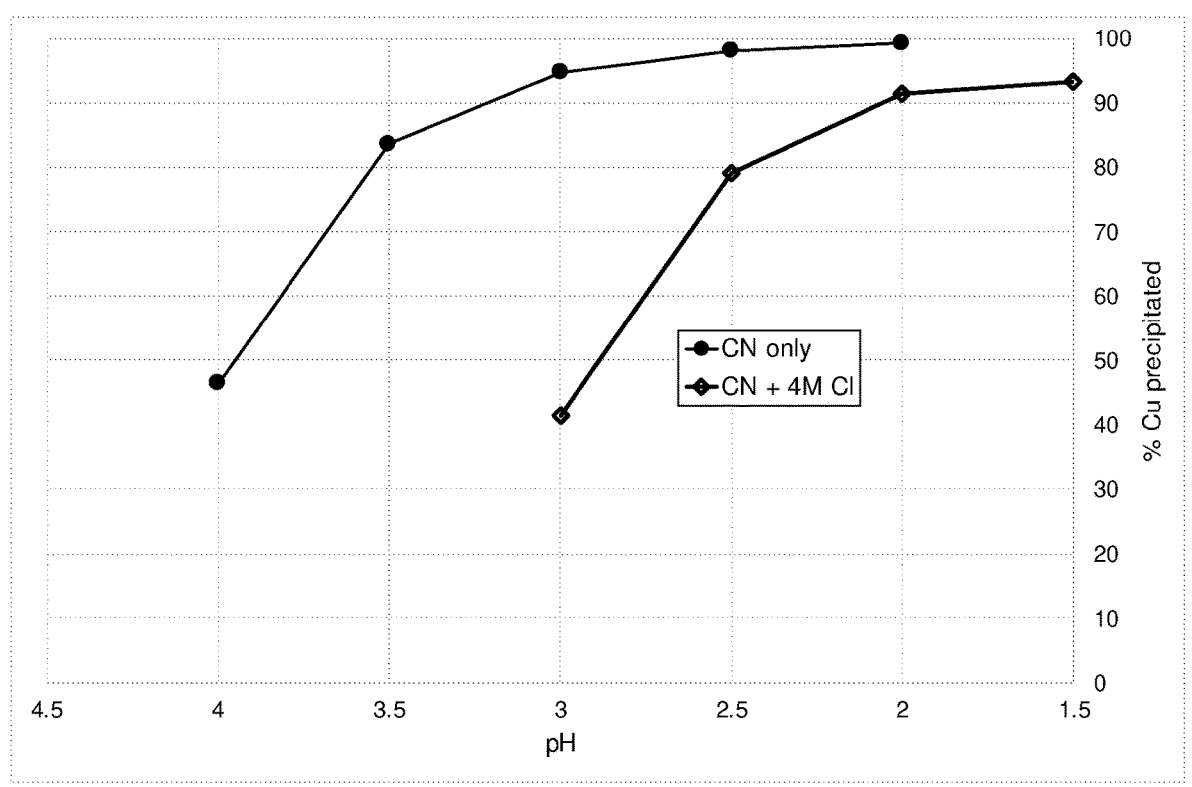
FIG. 9 shows the precipitated copper recovery as a function of pH when acidifying copper cyanide solutions, with and without chloride, as obtained in Example 3.
Figure 10:
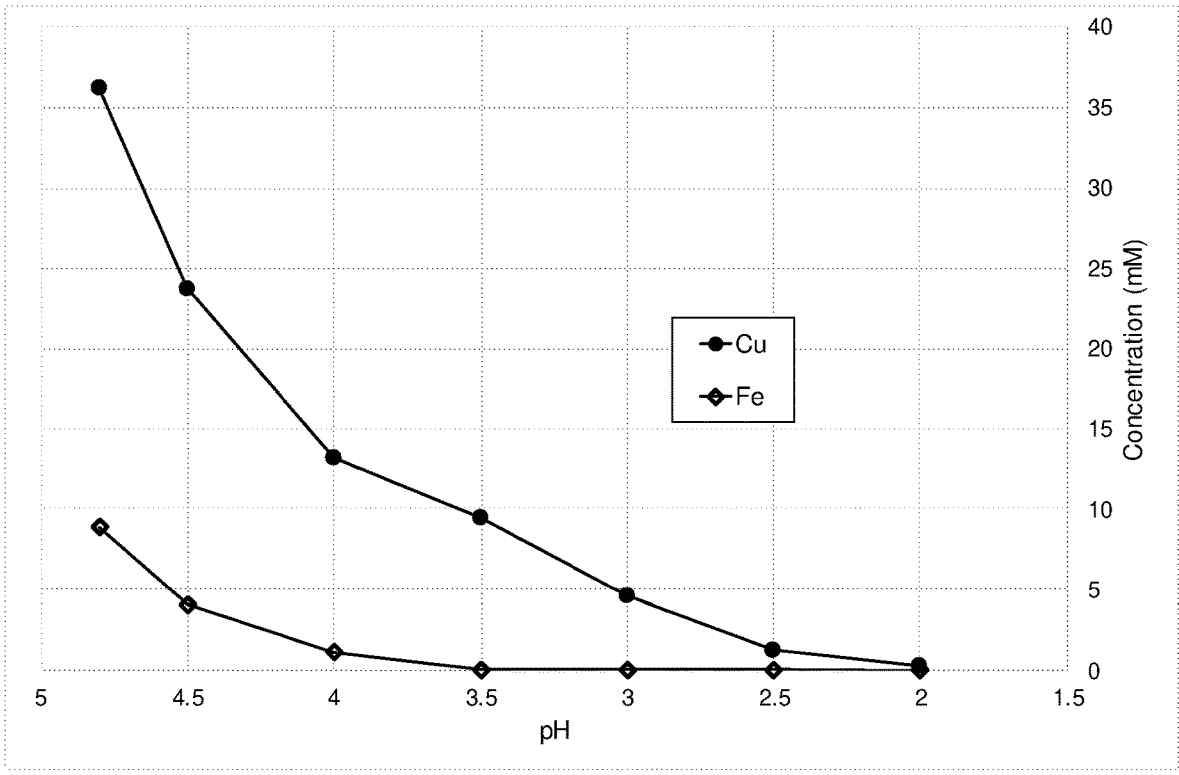
FIG. 10 shows the copper and iron solution concentrations as a function of pH when inducing precipitation by acidification of a solution containing copper cyanide and ferrocyanide complexes, as obtained in Example 4.
Figure 11:
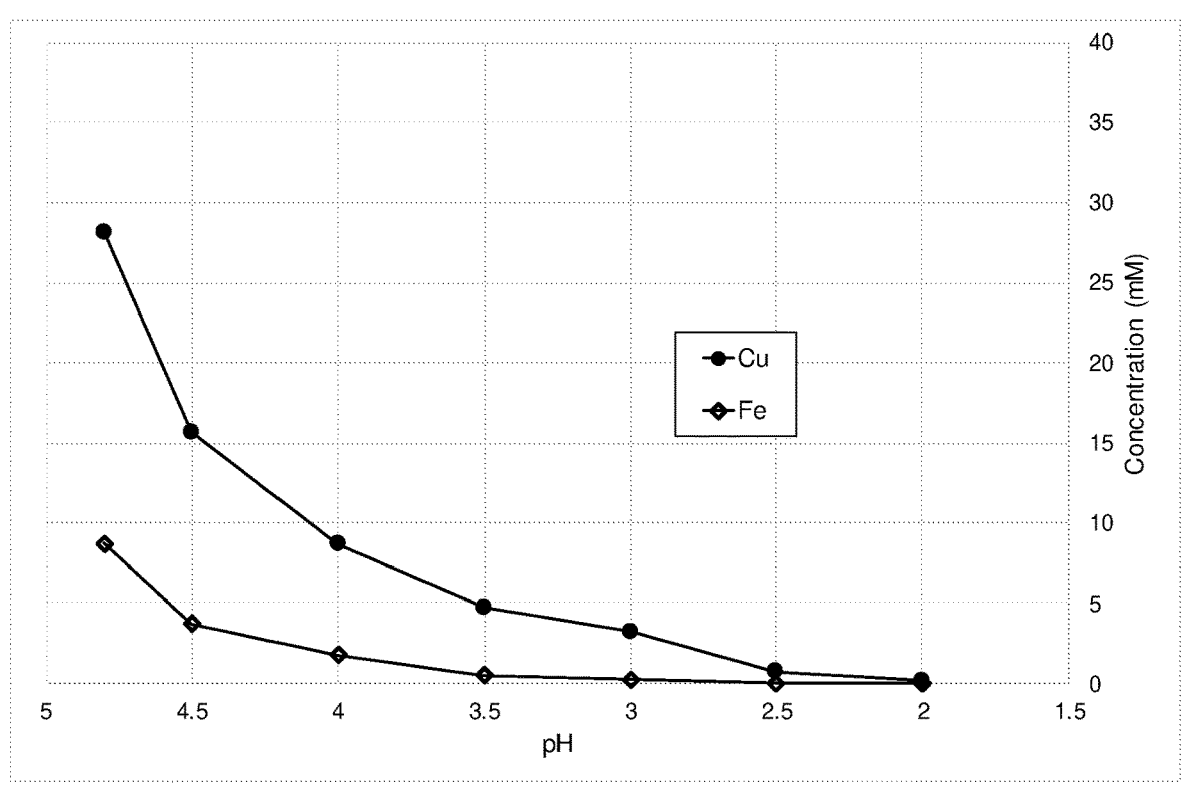
FIG. 11 shows the copper and iron solution concentrations as a function of pH when inducing precipitation by acidification of a solution containing copper cyanide and ferricyanide complexes, as obtained in Example 4.

Precipitation experiments were then conducted using the method described in Example 3. The results are shown in FIGS. 10 and 11 for solutions 4-1 and 4-2 respectively. In both cases, iron precipitated from solution as the pH decreased, with quantitative ferrous or ferric iron precipitation by pH 3.5. As iron cyanides have very high stability constants ($FeCN_6^{3-}:10^{42.3}$; $FeCN_6^{4-}:10^{35.4}$), cyanide dissociation from iron at pH 3.5 to precipitate iron hydroxide was unlikely. Instead, it was expected that mixed-metal cyanide complexes such as $Cu_4Fe(CN)_6$ or $Cu_3Fe(CN)_6$ were precipitated. The presence of iron also resulted in copper precipitation at higher pH values: c.a. 64-69% of the copper was precipitated at pH 4, compared with less than 50% in the absence of iron (c.f. FIG. 9).

Example 5

A strong base ion-exchange resin (Purolite A500/2788) was loaded by contacting it with solution 1-2 (from example 1) in a batch process overnight. The loaded resin was rinsed and eluted using elution method 2-2 (from example 2) to produce an alkaline eluate and an acid eluate. The first four bed volumes of the alkaline elution were collected (solution 5-1) and used in the subsequent precipitation tests as most of the copper and iron was eluted by this time (see FIG. 7). The first four bed volumes of the acid elution were also collected (solution 5-2).

Figure 12:
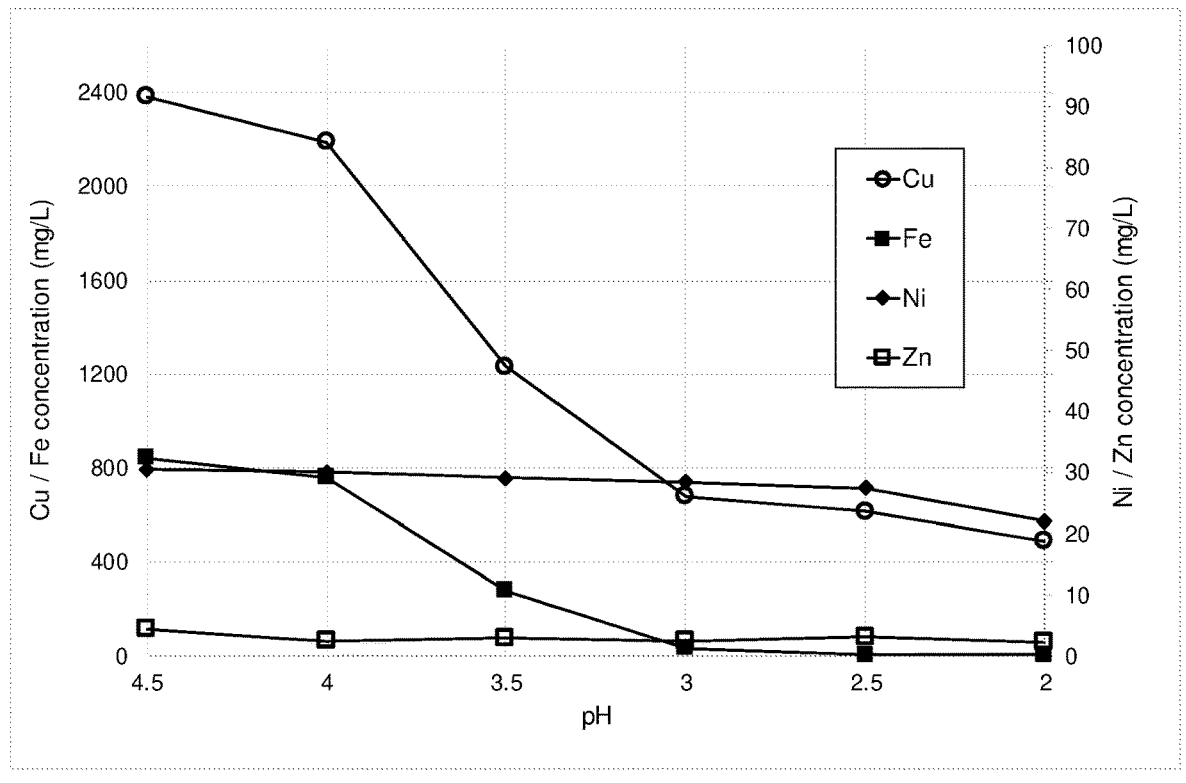
FIG. 12 shows the copper, iron, nickel and zinc solution concentrations as a function of pH when inducing precipitation by acidification of an ion-exchange resin eluate containing copper cyanide and iron cyanide complexes, as obtained in Example 5.

Precipitation was induced by acidifying solution 5-1 using the method described in Example 3. The results are shown in Table 3 and FIGS. 12 and 13.

TABLE 3

|  | Cu (mg/L) | Fe (mg/L) | Ni (mg/L) | Zn (mg/L) | SCN (mM) |
|---|---|---|---|---|---|
| Alkaline eluate solution 5-1 | 2443 | 897 | 32 | 24 | 2.9 |
| Barren supernatant (at pH 2) | 486 | 3 | 22 | 2 | 2 |
| Precipitation efficiency (%) | 80 | 100 | 32 | 91 | 32 |

Figure 13:
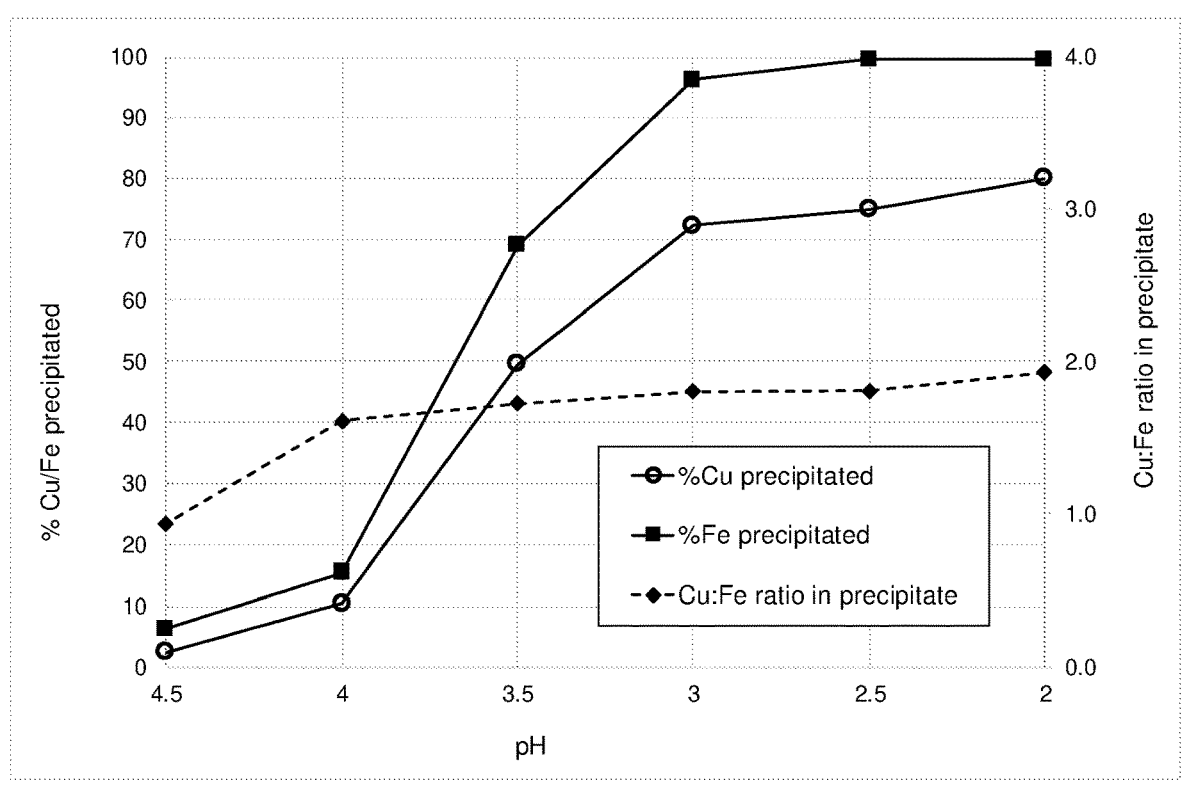
FIG. 13 shows the copper and iron precipitated recoveries, and the Cu:Fe molar ratio in the precipitate, as a function of pH when inducing precipitation by acidification of an ion-exchange resin eluate containing copper cyanide and iron cyanide complexes, as obtained in Example 5.

Solution 5-1 contained copper and iron but only low levels of zinc and nickel. The chloride concentration was also high as the eluant contained 4M NaCl. Copper and iron started to precipitate below pH 4.5 but accelerated at pH of 3. At pH 3, about 70% copper was precipitated and iron precipitation was close to complete. The precipitation of copper and iron appeared to be correlated. A Cu:Fe molar ratio in the precipitate was calculated based on the change in solution concentrations, and the results are shown in FIG. 13. At pH 3 where the majority of copper and nearly all iron were precipitated, the Cu:Fe molar ratio was 1.8. This ratio suggests the formation of either the Cu(II) complex $Cu_2Fe$ $(CN)_6$ or the Cu(I) complex $Cu_2Na_2Fe(CN)_6$ according to Reaction (1) or Reaction (2). Although no oxygen was added on purpose, there was oxygen present in the solution and in the headspace that could have oxidised copper to Cu(II).

$$4Cu(CN)_3{}^{2-}+2Fe(CN)_6{}^{4-}+16H^++O_2 \rightarrow 2Cu_2Fe(CN)_6+12HCN+2H_2O \quad (1)$$

$$4Cu(CN)_3{}^{2-}+2Fe(CN)_6{}^{4-}+12H^++4Na^+ \rightarrow 2Cu_2Na_2Fe(CN)_6+12HCN \quad (2)$$

The continuing but slow precipitation of copper below pH 3, after depletion of iron, was potentially due to CuCN and/or CuSCN precipitation. However, due to the high chloride concentration, precipitation of single-metal copper cyanide complexes was inhibited and copper precipitation was incomplete even at pH 2.

Another precipitation experiment was conducted on solution 5-1, similar to that described above but conducted under a nitrogen atmosphere to eliminate oxygen. Almost identical results were obtained, with a Cu:Fe ratio of 1.9 in the precipitate formed at pH 3. This suggests that $Cu_2Na_2Fe$ $(CN)_6$, rather than $Cu_4Fe(CN)_6$, is precipitated in the absence of oxygen. The presence of high sodium concentrations in solution 5-1 (NaCl introduced to provide a 4 M chloride concentration in the eluant) may have contributed to the formation of $Cu_2Na_2Fe(CN)_6$ rather than $Cu_4Fe(CN)_6$.

Example 6

After the low-oxygen precipitation reaction in Example 5, the precipitate was recovered by filtration (precipitate 6-1) and the filtered supernatant solution (solution 6-2, containing 360 mg/L Cu but very low iron, zinc and nickel, at pH 2) was subjected to sulfidization with sodium sulfide (Na$_2$S). The resultant precipitation of copper sulfide caused the copper concentration in solution to decrease to 10 mg/L in 10 minutes.

Example 7

The precipitation of nickel and zinc from acid eluant solution 5-2 (as produced in example 5) was investigated by combining it with alkaline eluant solution 5-1 which contained copper and iron cyanides. This was investigated as a potential means to remove nickel and zinc from the acid eluant when there is excess iron available in the alkaline eluant. The results are shown in Table 4.

TABLE 4

|  |  | Cu (mg/L) | Fe (mg/L) | Ni (mg/L) | Zn (mg/L) |
|---|---|---|---|---|---|
| Alkaline eluant (5-1) | Initial metal content | 2443 | 897 | 32 | 24 |
| Acidic eluant (5-2) | Initial metal content | 20 | 0 | 1006 | 1190 |
| Test 1. 5-1:5-2 = 2:1 | Metal content at 10 min | 166 | 0 | 328 | 160 |
|  | Precipitation efficiency (%) | 90% | 100% | 8% | 61% |
| Test 2 5-1:5-2 = 3:1 | Metal content at 10 min | 199 | 0 | 220 | 78 |
|  | Precipitation efficiency (%) | 89% | 100% | 20% | 75% |

In Test 1, two parts of alkaline eluate solution 5-1 and one part of acidic eluate solution 5-2 were mixed. The resultant pH was 0.04, increasing to 0.36 over the 60-minute testing period. The iron was completely precipitated in 10 minutes along with significant decrease in other metals (90% copper, 61% zinc, but only 8% nickel). Only minor changes in metal concentrations were observed over the next 50 minutes once the iron was depleted. The metal:iron molar ratios in the precipitate were calculated to be Cu:Fe=2.2, Ni:Fe=0.05, Zn:Fe=0.36 and total (Cu+Ni+Zn):Fe ratio=2.6. This suggests the precipitation of some CuCN along with $Na_2Cu_2Fe$ $(CN)_6$, $Ni_2Fe(CN)_6$ and $Zn_2Fe(CN)_6$.

In Test 2, three parts of the alkaline eluate solution 5-1 and one part of acidic eluate solution 5-2 were mixed, thus increasing the Fe:Ni and FeZn ratio in the mixed solution compared to Test 1. As a result, the recovery of precipitated nickel and zinc after 10 minutes was further increased to 20% and 75% respectively. It is expected that complete precipitation of nickel and zinc could be achieved if sufficient iron was available. The results suggest that nickel and zinc can be effectively removed from acidic eluate by precipitation induced by addition of iron cyanide, whilst the cyanide associated with these metals can be released for recovery. Residual copper after Fe, Ni and Zn removal, about 200 mg/L, was effectively removed by sulfidisation as described in Example 6.

Example 8

Figure 14:
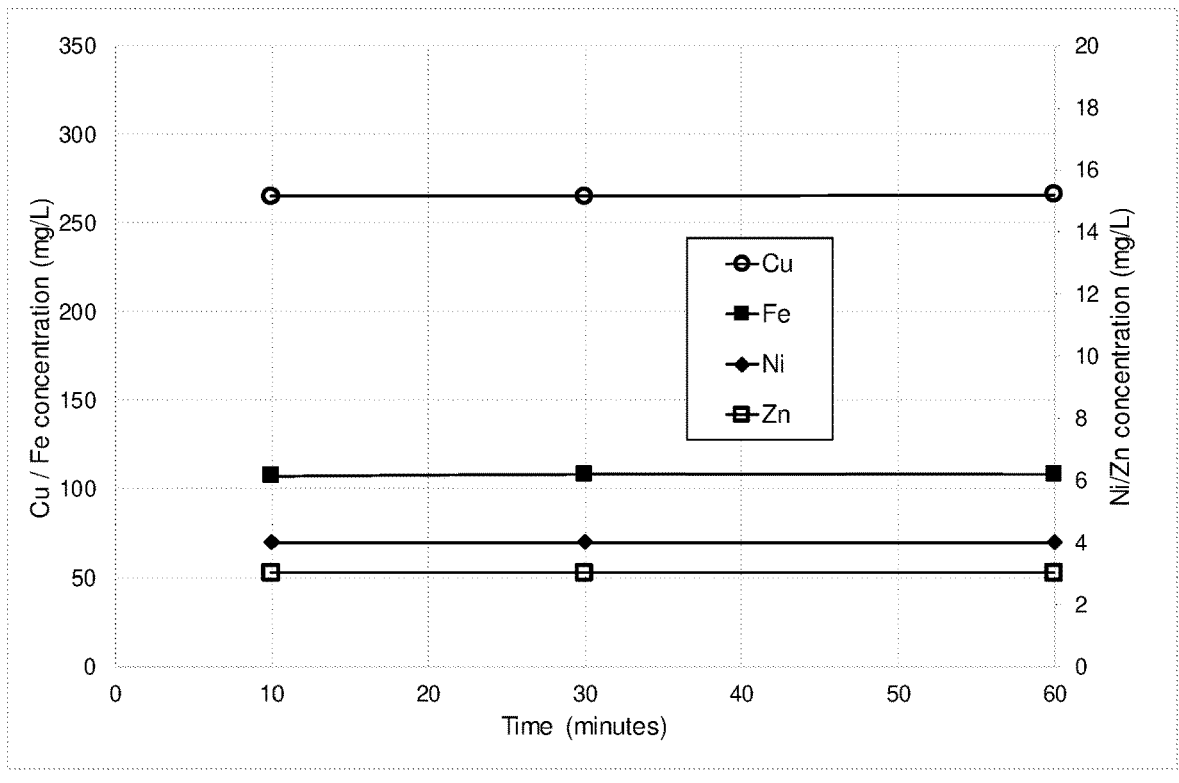
FIG. 14 shows the copper, iron, nickel and zinc solution concentrations as a function of time when dissolving a precipitate comprising copper-iron mixed-metal cyanide complex in a cyanide solution, as obtained in Example 8.

The dissolution of copper-ferrocyanide mixed-metal complexes in free cyanide-containing solutions was investigated. Precipitate 6-1 (produced in Example 5, and recovered in Example 6) is understood to contain mainly $Cu_2Na_2$ $Fe(CN)_6$, possibly together with small amounts of CuCN and/or CuSCN. This precipitate was added to an aqueous NaCN solution to target a final CN:Cu ratio of approximately 3:1, and the results are shown in FIG. 14. Dissolution of the precipitate was fast, with complete dissolution by 10 minutes. The dissolved copper complexes with free cyanide to form copper cyanides, e.g. $Cu(CN)_3{}^{2-}$, while the iron remains as $Fe(CN)_6{}^{4}$. The concentrations of zinc and nickel were low, since these components were present only in trace amounts in the alkaline eluate from which precipitate 6-1 was derived.

Example 9

A synthetic tails solution (9-1) was prepared having the composition shown in Table 5. Copper cyanide (CuCN) was dissolved in the solution to convert the free cyanide to copper cyanides; the resultant solution (9-2) had the composition shown in Table 5.

TABLE 5

|  | CN⁻ (mg/L) | SCN⁻ (mg/L) | CNO⁻ (mg/L) | Cl⁻ (mg/L) | Cu (mg/L) | Fe (mg/L) | Ni (mg/L) | Zn (mg/L) | Ca (mg/L) | Na (mg/L) | K (mg/L) |
|---|---|---|---|---|---|---|---|---|---|---|---|
| 9-1 | 200 | 10 | 30 | 7140 | 50 | 10 | 0.5 | 2 | 1400 | 3207 | 121 |
| 9-2 | 0 | 10 | 30 | 7140 | 280 | 10.6 | 0.9 | 1.4 | 1023 | 3466 | 122 |

Absorption tests using solution 9-2 was performed using a strong base ion-exchange resin (Purolite A500/2788, initially in chloride form) loaded into an 8 mL resin column coupled with a fraction collector. The solution was pumped through the resin column at 5 BV hr⁻¹ with 1 BV fractions collected by the fraction collector. One sample out of every five fractions was subjected to metal analysis by ICP, thiocyanate analysis by HPLC and free cyanide analysis (if required) by potentiometric titration with silver nitrate.

The loaded resin was then eluted using elution method 9-1 below at ambient temperature. 1 BV solution samples were collected using a fraction collector and analysed for metal species using ICP and thiocyanate using HPLC. Solution samples were collected in each elution fraction for metal analysis by ICP and thiocyanate analysis by HPLC.

Elution 9-1. (1) Resin presoak with 0.5 BV of 3 M NaCl+1 M NaCN solution for 2 hours, (2) elution with 10 BVs of 4 M NaCl+10 mM NaCN solution at 2 BV hr⁻¹, (3) wash with 0.5 BV water at 2 BV hr⁻¹.

Three cycles of sequential absorption with solution 9-2 and elution with elution method 9-1 were performed as described above, without intermediate acid treatment. The first 5 BVs of the eluant in each cycle was collected for subsequent treatment to precipitate metals. The last 6 BVs of the metal-lean resin eluate were recycled to eluant in the next cycle, using the elution configuration described herein with reference to FIG. 2. A barren resin sample (0.5 mL) was taken after each cycle and subjected to a stripping method to determine the residual loadings of various species on the barren resin. The resin volume was then topped up to 8 mL with 0.5 mL fresh resin before recycling to the next resin adsorption step. After the third cycle, the eluted resin was subjected to acid elution using 2 BVs of water wash followed by 8 BVs of 1 M H₂SO₄ at 2 BV/hour. The results are shown in Table 6.

In cycle 1, 110 BV of solution 9-2 was passed through the resin column. Adsorption was strong for Cu, Fe, Ni and Zn, as their respective anion cyanide complexes. Copper and iron broke through at about 75 BVs, while thiocyanate started to break through at about 65 BVs. The adsorption of bath nickel and zinc were close to 100% throughout. Calcium, sodium, potassium, chloride and cyanate were not significantly absorbed on the resin. The copper loading on the pregnant resin was 82,334 g/t, occupying a majority of the resin capacity (865 mM out of 1200 mM) due to its relatively high concentration in the feed compared to other species.

The elution of copper and iron in cycle 1 was effective with most of these species reporting to the first 3 BVs. The elution efficiency for copper was 89%, lower than in Example 2 due to a significantly higher loading of copper on the pregnant resin. Iron was quantitatively eluted, while zinc and nickel remained on the resin.

In cycles 2 and 3, only 80 BV of solution 9-2 was passed through the resin column, so that the total copper loading in the pregnant resin was lower than in cycle 1. Copper and iron broke through at about 65 BVs in cycle 2, earlier than in cycle 1 due to residual copper on the resin after cycle 1. Nickel and zinc were again quantitatively absorbed.

The elution of iron was again near-quantitative in cycles 2 and 3, and the copper elution efficiencies (92% and 97%) were higher than in cycle 1 (90%) due to the lower copper loading in the pregnant resin. The barren resin contained lower residual amounts of copper following elution (6476 and 1914 g/t in cycles 2 and 3, vs 8897 g/t in cycle 1). Nickel and zinc were not eluted, so that these components accumulated on the resin through the three cycles. However, since the total amount of these components remained low and the resin remained effective for copper and iron absorp-

TABLE 6

| Process step | BVs | Resin sample | Cu | Fe | Ni | Zn |
|---|---|---|---|---|---|---|
| Loading cycle 1 | 110 | Pregnant resin (g/t) | 82334 | 1663 | 302 | 445 |
| Elution cycle 1: | 11 | Barren resin (g/t) | 8887 | 24 | 296 | 397 |
| total | | Efficiency (%) | 89 | 99 | 2 | 9 |
| Elution cycle 1: | 5 | Conc (mg/L) | 4403 | 109 | 0.4 | 3 |
| first 5 BV's | | % of total eluted species | 90 | 100 | 100 | 100 |
| Loading cycle 2 | 80 | Pregnant resin (g/t) | 78576 | 2056 | 492 | 704 |
| Elution cycle 2: | 11 | Barren resin (g/t) | 6476 | 73 | 486 | 667 |
| total | | Efficiency (%) | 92 | 96 | 1 | 5 |
| Elution cycle 2: | 5 | Conc (mg/L) | 4220 | 132 | 0 | 2 |
| first 5 BV's | | % of total eluted species | 88 | 100 | 100 | 100 |
| Loading cycle 3 | 80 | Pregnant resin (g/t) | 73327 | 2109 | 585 | 1041 |
| Elution cycle 3: | 11 | Barren resin (g/t) | 1914 | 45 | 576 | 1004 |
| total | | Efficiency (%) | 97 | 98 | 2 | 4 |
| Elution cycle 2: | 5 | Conc (mg/L) | 4149 | 138 | 1 | 2 |
| first 5 BV's | | % of total eluted species | 87 | 100 | 100 | 100 |
| Acid elution | 8 | Barren resin (g/t) | 668 | 11 | 11 | 22 |
| | | Accumulated efficiency (%) | 99 | 99 | 98 | 98 | tion-elution, it is anticipated that multiple further cycles could have been be conducted without the need for acid treatment.

After the third cycle, the resin was subjected to acid elution which removed the nickel and zinc, as well as some residual copper. The accumulated elution efficiencies (i.e. across the three alkaline absorption-elution cycles and the acid elution) were thus extremely high for all metal components. The barren resin after acid treatment appeared visually identical to the fresh resin.

Example 10

The first 5 BV of the alkaline eluant from each of cycles 1, 2 and 3 in Example 9 were combined to produce alkaline eluate solution 10-1, which was used for metal precipitation and cyanide recovery tests. Copper-iron precipitation experiments were conducted using a 100 ml reactor coupled to a gas scrubber containing 0.5 M NaOH solution. The reactor and scrubber were sealed and operated under a slight negative pressure so that the hydrogen cyanide gases were captured in the scrubber. The solution was transferred to the reactor (100 mL) and acidified by adding 2 M sulfuric acid with a computer-controlled Dosimat to reduce the pH of the solution to desired pH values in stages.

Metal precipitation was conducted in two stages. In stage 1, the pH of the resin eluate was reduced to pH 3 and maintained for 10 minutes to allow precipitation of copper and iron. The stage 1 precipitate was filtered and the filtrate was recovered (solution 10-2). In stage 2, solution 10-2 was subjected to sulfidization by adding sodium sulfide (Na$_2$S) in a twofold stoichiometric excess based on Cu$_2$S formation.

(such as solution 9-1 in Example 9) will increase the iron content in the system until the stage 1 precipitate becomes predominantly mixed-metal copper iron cyanide complexes at a steady-state.

Samples were also taken from solution 10-3 and from the scrubber for free cyanide analysis by silver nitrate titration. It was calculated that 92% of the cyanide, present as copper-complexed cyanide in solution 10-1, was recovered in these solutions, with the missing 8% attributable to losses in the small-scale experimental procedure.

Example 11

Figure 15:
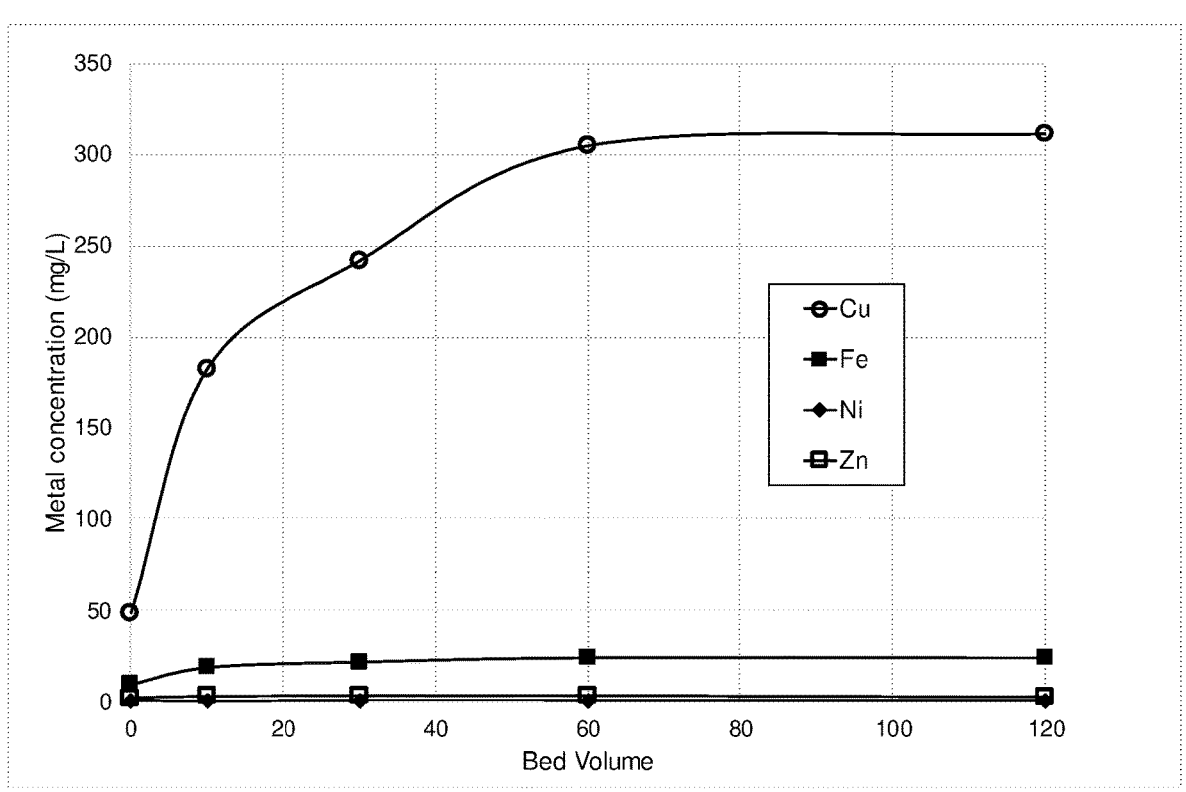
FIG. 15 shows the copper, iron, nickel and zinc solution concentrations as a function of time when dissolving the precipitate obtained in Example 10 in a synthetic tails solution comprising free cyanide, as obtained in Example 11.

The filtered stage 1 precipitate from Example 10 was added to synthetic tails solution 9-1 to take up the free cyanide therein, the volume of the solution being calculated to match the amounts of free cyanide in solution and the copper expected in the precipitate. The wet filter cake mass took some time to break up, but complete dissolution of the precipitate was achieved in 60 minutes, with no free cyanide detected in the resulting solution. The results are shown in FIG. 15. Both the copper and iron concentrations in the solution increased as a result of the dissolution, with the copper complexing the free cyanide in solution. Negligible amounts of nickel and zinc were introduced as these components were substantially absent from the stage 1 precipitate.

Example 12

A synthetic tails solution (12-1) was prepared having the composition shown in Table 8.

TABLE 8

| | CN$^-$ (mg/L) | SCN$^-$ (mg/L) | Cl$^-$ (mg/L) | Cu (mg/L) | Fe (mg/L) | Ni (mg/L) | Zn (mg/L) | Ca (mg/L) | Na (mg/L) | K (mg/L) |
|---|---|---|---|---|---|---|---|---|---|---|
| 12-1 | 0 | 10 | 7140 | 213 | 72 | 0.5 | 2 | 1400 | 3207 | 121 |

Upon addition of Na$_2$S, the pH of the solution increased above 6 but was reduced to and controlled at pH 4.9 by the Dosimat. Precipitation was allowed to occur for 10 minutes and the stage 2 precipitate was then filtered. The pH of the sulfidization filtrate was adjusted to above 11 by NaOH addition to provide solution 10-3. Samples were taken from solutions 10-1, 10-2 and 10-3 for metal analysis by ICP. The solution volume change due to acid addition was taken into account when calculating the metal concentrations. The results are shown in Table 7.

TABLE 7

| Solution | Cu (mg/L) | Cu recovery (%) | Fe (mg/L) | Fe recovery (%) | Ni (mg/L) | Zn (mg/L) |
|---|---|---|---|---|---|---|
| Feed solution 10-1 | 4403 | | 129 | | 0.2 | 2.56 |
| Acidification filtrate solution 10-2 | 2199 | 50 | 12 | 91 | 0.4 | 1.18 |
| Sulfidization filtrate solution 10-3 | 25 | 99 | 12 | 91 | 0.6 | 0.02 |

Figure 16:
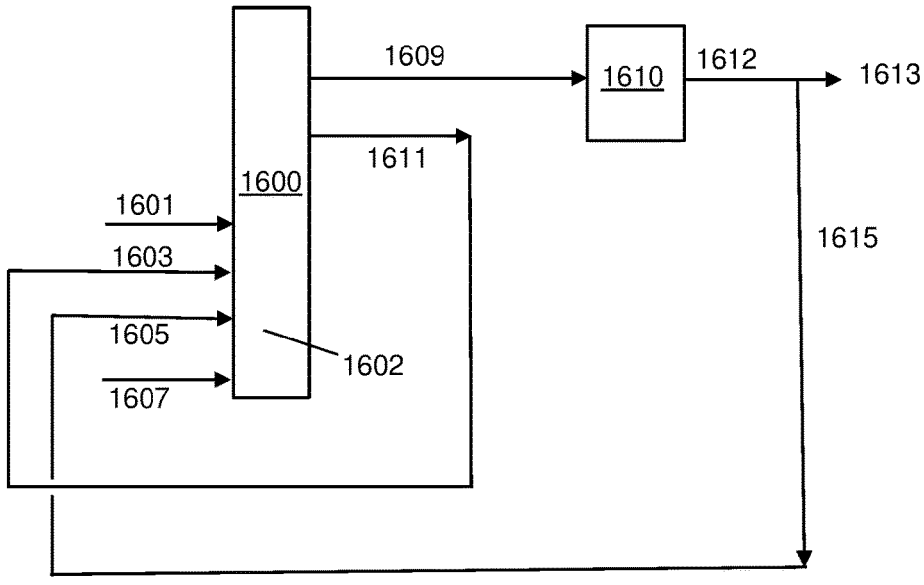
FIG. 16 schematically shows the elution methodology, with eluant regeneration and recycling after each elution cycle, used in Example 12.

Due to the low concentration of iron in solution 10-1, it is expected that the stage 1 precipitate was mainly CuCN with only minor amounts of mixed-metal cyanide complexes such as Cu$_2$Na$_2$Fe(CN)$_6$. However, repeated recycling of this precipitate to absorb free cyanide in a tails solution Anions were absorbed from solution 12-1 using a strong base ion-exchange resin (Puromet™ MTA 5011; rebranded name of Purolite A500/2788, initially in chloride form) loaded into a 500 mL resin column. An amount of 65 BV of solution 12-1 was pumped through the resin column at 5 BV hr$^{-1}$. The pregnant resin was removed from the column and used in a series of desorption experiments with eluant recycling (as schematically shown in FIG. 16). The loading of metals on the pregnant resin is shown in Table 9.

Cycle 1

In a first desorption cycle (cycle 1), described with reference to FIG. 16, a portion of pregnant resin 1602 (produced as described above) was placed in 100 ml elution column 1600 and eluted using elution method 12-1 at ambient temperature:

Elution 12-1. (1) Resin conditioning by continuously recirculating 0.5 BV of conditioning eluant 1601 (4.5 M NaCl+1.2 M NaCN solution) at 10 BV hr$^{-1}$ through the column for 2 hours, (2) continuous once-through elution with 8 BVs of eluant 1603 (4 M NaCl+20 mM NaCN solution) at 2 BV hr$^{-1}$, (3) wash with 0.5 BV of water 1607 at 2 BV hr$^{-1}$. Total of 9 BV eluate.

The first 4 BV of eluate, eluate fraction 1609, was treated to precipitate metals and remove free cyanide in process step 1610 (see below). The resultant barren eluate 1612 was split into a 1 BV portion which was purged (purge 1613), and a 3 BV portion (external recycle 1615) which was recycled to form eluant 1605 in the next cycle (see below). The last 5 BVs of eluate, eluate fraction 1611, was recycled without treatment to form eluant 1603 in the next cycle (see below).

Eluate fraction 1609 and eluate fraction 1611 were analysed for metal species using ICP in each cycle. A resin sample was taken after each elution cycle and subjected to resin strip to determine the loadings of various species on the barren resin.

Eluate fraction 1609 was subjected to metals precipitation and cyanide recovery in three-stage process step 1610 as follows:

1. Acid precipitation of copper and iron: the pH of eluate fraction 1609 was reduced to 2.8 by addition of 32% HCl and maintained at this pH by further additions of HCl (using a computer controlled Dosimat) for 60 minutes (c.a. 11 mL HCl into c.a. 400 mL solution). Copper and iron precipitated as Na$_2$Cu$_2$Fe(CN)$_6$, which was then recovered by filtering;
2. Sulfide precipitation: to the stage 1 filtrate was added a twice stoichiometric amount of sodium sulfide (based on Cu$_2$S formation); upon addition of Na$_2$S the pH of the solution increased to >pH 5 but this was reduced to and controlled at ~pH 4.5 by further HCl addition (using the Dosimat). After 10 minutes, the precipitate was recovered by filtering.
3. Cyanide recovery: After sulfide precipitation, the filtrate was subjected to cyanide recovery using a gas membrane apparatus. Over a period of 30 minutes, the filtrate was recirculated through the membrane contactor counter-current to an alkaline strip solution (400 mL of 4 M NaOH) at a flow rate of 200 mL min$^{-1}$. A solution sample each was taken from the filtrate feed, the barren filtrate (1612) (following cyanide recovery) and the strip solution for free cyanide measurement by potentiometric silver nitrate titration.

Cycles 2-4

Three further desorption cycles (cycles 2, 3 and 4) were then performed using recycled eluant, in each case starting with a fresh portion of pregnant resin 1602 in elution column 1600. The elution was conducted using elution method 12-2 at ambient temperature:

Elution 12-2. (1) Resin conditioning by continuously recirculating 0.5 BV of conditioning eluant 1601 (4.5 M NaCl+1.2 M NaCN solution) at 10 BV hr$^{-1}$ through the column for 2 hours, (2) continuous once-through elution with 5 BVs of eluant 1603 (recycled eluate fraction 1611 from the preceding cycle, with solid NaCl added to increase concentration to 4 M and solid NaCN added to increase concentration to 20 mM) at 2 BV hr$^{-1}$, (3) continuous once-through elution with 3 BVs of eluant 1605 (external recycle 1615 from the preceding cycle, with solid NaCl added to increase concentration to 4 M and solid NaCN added to increase concentration to 20 mM) at 2 BV hr$^{-1}$ (4) wash with 0.5 BV of water 1607 at 2 BV hr$^{-1}$. Total of 9 BV eluate.

The first 4 BV of eluate, eluate fraction 1609, was treated to precipitate metals in process step 1610 (as described for cycle 1, except that the 4M NaOH strip solution from cycle 1 was reused in each of cycles 2-4 to allow the cyanide concentration to accumulate). In cycles 2 and 3, the resultant barren eluate 1612 was split into a 1 BV portion which was purged (purge 1613), and a 3 BV portion (external recycle 1615) which was recycled to form eluant 1605 in the next cycle. The last 5 BVs of eluate, eluate fraction 1611, was recycled to form eluant 1603 in the next cycle.

The metal elution results are shown in Table 9 and Table 10. As seen in Table 9, very high copper recovery (93-97%) and near-quantitative iron recovery (99-100%) was obtained in each elution cycle. As seen in Table 10, most of the eluted copper and iron reported to eluate fraction 1609, with only a small proportion of copper and almost no iron internally recycled via eluate fraction 1611 for use as eluant 1603 in the next cycle. The successful recycling of bath eluate fraction 1611 (as internal recycle) and eluant fraction 1609 (after regeneration, as external recycle 1615) to the eluant demonstrates that the eluant, and particularly its chloride component, can be recycled repeatedly in the elution circuit.

TABLE 9

| Process step | Resin sample | Cu | Fe | Ni | Zn |
|---|---|---|---|---|---|
| Loading (cycles 1-4) | Pregnant resin (g/t) | 38402 | 13028 | 351 | 1003 |
| Elution cycle 1 | Barren resin (g/t) | 1093 | 30 | 329 | 924 |
| | Efficiency (%) | 97 | 100 | 6 | 8 |
| Elution cycle 2 | Barren resin (g/t) | 2226 | 91 | 327 | 937 |
| | Efficiency (%) | 94 | 99 | 7 | 7 |
| Elution cycle 3 | Barren resin (g/t) | 2368 | 108 | 328 | 920 |
| | Efficiency (%) | 94 | 99 | 6 | 8 |
| Elution cycle 4 | Barren resin (g/t) | 2813 | 91 | 329 | 929 |
| | Efficiency (%) | 93 | 99 | 6 | 7 |

TABLE 10

| Process step | Eluate sample | Cu mg/L | % | Fe mg/L | % | Ni mg/L | Zn mg/L |
|---|---|---|---|---|---|---|---|
| Elution cycle 1 | fraction 1609 (4 BV) | 2529 | 89 | 1115 | 99 | 1 | 3 |
| | fraction 1611 (5 BV) | 313 | 11 | 12 | 1 | 1 | 3 |
| Elution cycle 2 | fraction 1609 (4 BV) | 2642 | 84 | 942 | 95 | 1 | 3 |
| | fraction 1611 (5 BV) | 505 | 16 | 50 | 5 | 1 | 3 |
| Elution cycle 3 | fraction 1609 (4 BV) | 2823 | 82 | 1002 | 94 | 1 | 3 |
| | fraction 1611 (5 BV) | 625 | 18 | 62 | 6 | 1 | 3 |
| Elution cycle 4 | fraction 1609 (4 BV) | 2777 | 82 | 1002 | 94 | 1 | 3 |
| | fraction 1611 (5 BV) | 623 | 18 | 68 | 6 | 1 | 3 |

The metal precipitation results (process step 1610) are shown in Table 11. After acidification of eluate fraction 1609 with H to pH of 2.8 (stage 1 of process step 1610), the majority of the iron was removed from solution and a precipitate was formed. The Cu:Fe ratio in the precipitate (calculated based on change in solution Cu/Fe concentrations) was about 2, which is consistent with the formation of Na$_2$Cu$_2$Fe(CN)$_6$ as the primary solid product. Subsequent sulfide precipitation (stage 2 of process step 1610) was effective to further reduce copper, achieving c.a. 98% accumulative copper precipitation rate in all cycles. Thus, the amount of copper recycled to eluant 1605 is acceptably low (<100 mg/L in eluant fraction 1615).

TABLE 11

| Process step | Eluate sample | Cu (mg/L) | Fe (mg/L) | Cu recovery (%) | Fe recovery (%) | Cu:Fe in precipitate |
|---|---|---|---|---|---|---|
| Elution cycle 1 | Eluate fraction 1609 | 2529 | 1115 | | | |
| | After Na$_2$Cu$_2$Fe(CN)$_6$ precipitation $^a$ | 281 | 94 | 89 | 92 | 2.1 |
| | After Cu$_2$S precipitation $^b$ | 44 | 91 | 98 | 92 | |
| Elution cycle 2 | Eluate fraction 1609 | 2642 | 942 | | | |
| | After Na$_2$Cu$_2$Fe(CN)$_6$ precipitation $^a$ | 390 | 80 | 85 | 92 | 2.3 |
| | After Cu$_2$S precipitation $^b$ | 43 | 76 | 98 | 92 | |
| Elution cycle 3 | Eluate fraction 1609 | 2823 | 1002 | | | |
| | After Na$_2$Cu$_2$Fe(CN)$_6$ precipitation $^a$ | 605 | 86 | 79 | 91 | 2.1 |
| | After Cu$_2$S precipitation $^b$ | 63 | 79 | 98 | 92 | |
| Elution cycle 4 | Eluate fraction 1609 | 2777 | 1002 | | | |
| | After Na$_2$Cu$_2$Fe(CN)$_6$ precipitation $^a$ | 385 | 23 | 86 | 98 | 2.2 |
| | After Cu$_2$S precipitation $^b$ | 63 | 14 | 98 | 99 | |

$^a$ after stage 1 of process step 1610;
$^b$ after stage 2 of process step 1610.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A process for removing cyanide from a cyanide-bearing aqueous fluid, the process comprising:

(i) adding a solid composition comprising a first mixed-metal cyanide complex comprising copper and iron to a cyanide-bearing aqueous fluid comprising free cyanide and metal-complexed cyanide, wherein at least a portion of the first mixed-metal cyanide complex dissolves, with complexation of the copper by the free cyanide, to produce an aqueous solution comprising cyanometallates, the cyanometallates comprising copper cyanide and iron cyanide complexes derived from the first mixed-metal cyanide complex;

(ii) contacting the aqueous solution with an anion-exchange absorbent to absorb the cyanometallates, thereby producing a cyanide-lean aqueous fluid;

(iii) extracting the anion-exchange absorbent comprising the absorbed cyanometallates with at least one non-acidic aqueous extractant to produce an aqueous extract comprising the copper cyanide and iron cyanide complexes; and (iv) acidifying the aqueous extract to produce a precipitate comprising a second mixed-metal cyanide complex comprising copper and iron.

2. The process according to claim 1, further comprising recycling at least a portion of the precipitate produced in step (iv) to form at least a portion of the solid composition added in step (i).

3. The process according to claim 1, further comprising adding an iron cyanide complex to the aqueous extract produced in step (iii) before acidifying the aqueous extract in step (iv).

4. The process according to claim 1, wherein the aqueous extract is acidified to a pH not lower than 2.5.

5. The process according to claim 1, wherein the precipitate comprises the second mixed-metal cyanide complex in an amount of at least 50 wt. %, based on the total solid content of the precipitate.

6. The process according to claim 1, wherein the first and second mixed-metal cyanide complexes are copper-ferrocyanide complexes.

7. The process according to claim 1, wherein the first and second mixed-metal cyanide complexes comprise Cu$_2$Na$_2$Fe(CN)$_6$.

8. The process according to claim 1, wherein at least 90% of all iron present in the anion-exchange absorbent after step (ii) is extracted into the aqueous extract in step (iii), and wherein at least 80% of all copper present in the anion-exchange absorbent after step (ii) is extracted into the aqueous extract in step (iii).

9. The process according to claim 1, wherein the non-acidic aqueous extractant comprises an anion selected from the group consisting of chloride, bromide, nitrate, thiocyanate, thiosulfate, and perchlorate.

10. The process according to claim 1, wherein the non-acidic aqueous extractant comprises chloride in an amount of at least 1 mol/litre.

11. The process according to claim 1, wherein the non-acidic aqueous extractant comprises free cyanide.

12. The process according to claim 1, wherein the anion-exchange absorbent is recycled after extraction in step (iii) for contact with the aqueous solution in step (ii), wherein the recycled anion-exchange absorbent is not acid treated or is acid treated only after multiple absorption-extraction cycles in which each absorption-extraction cycle comprises contacting the aqueous solution with the anion-exchange absorbent in step (ii), extracting the anion-exchange absorbent in step (iii) and recycling the anion-exchange absorbent after extraction in step (iii) for contact with the aqueous solution in step (ii).

13. The process according to claim 1, wherein the anion-exchange absorbent is a strong base ion-exchange resin.

14. The process according to claim 1, wherein the cyanometallates further comprise copper cyanide and/or iron cyanide complexes that were present in the cyanide-bearing aqueous fluid before adding the solid composition to the cyanide-bearing aqueous fluid in step (i).

15. The process according to claim 1, wherein the cyanometallates further comprise zinc cyanide and/or nickel cyanide complexes derived from the cyanide-bearing aqueous fluid, and wherein the zinc cyanide and/or nickel cyanide complexes are substantially retained in the anion-exchange absorbent after step (iii).

16. The process according to claim 1, wherein the acidified aqueous extract, produced by acidifying the aqueous extract to produce the precipitate in step (iv), is substantially free of dissolved iron.

17. The process according to claim 1, further comprising recovering residual copper from the acidified aqueous extract produced in step (iv) by sulfidization and/or further comprising recovering free cyanide from the acidified aqueous extract produced in step (iv).

18. The process according to claim 1, further comprising alkalizing the acidified aqueous extract produced in step (iv) and recycling the aqueous extract to form at least a portion of the non-acidic aqueous extractant in step (iii).

19. The process according to claim 1, wherein the cyanide-bearing aqueous fluid comprises a tails stream of a hydrometallurgical cyanidation process.

20. The process according to claim 1, wherein at least 95% of the free cyanide is complexed by copper derived from the first mixed-metal cyanide complex in step (i).

* * * * *